United States Patent
Takemoto

(10) Patent No.: US 12,203,896 B2
(45) Date of Patent: Jan. 21, 2025

(54) ULTRASONIC TESTING DEVICE, METHOD, PROGRAM, AND ULTRASONIC TESTING SYSTEM

(71) Applicant: MITSUBISHI HEAVY INDUSTRIES, LTD., Tokyo (JP)

(72) Inventor: Hiroshi Takemoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 941 days.

(21) Appl. No.: 17/041,183

(22) PCT Filed: Apr. 4, 2019

(86) PCT No.: PCT/JP2019/014994
§ 371 (c)(1),
(2) Date: Sep. 24, 2020

(87) PCT Pub. No.: WO2019/216071
PCT Pub. Date: Nov. 14, 2019

(65) Prior Publication Data
US 2021/0018473 A1    Jan. 21, 2021

(30) Foreign Application Priority Data

May 11, 2018 (JP) .................................. 2018-092257

(51) Int. Cl.
*G01N 29/44* (2006.01)
*G01N 29/06* (2006.01)
(Continued)

(52) U.S. Cl.
CPC ..... *G01N 29/4427* (2013.01); *G01N 29/0654* (2013.01); *G01N 29/38* (2013.01);
(Continued)

(58) Field of Classification Search
CPC ........... G01N 29/4427; G01N 29/0654; G01N 29/40; G01N 29/4445; G01N 29/4463;
(Continued)

(56) References Cited

U.S. PATENT DOCUMENTS 3,690,153 A    9/1972  Matay
3,955,405 A    5/1976  Couture
(Continued)

FOREIGN PATENT DOCUMENTS

CA    2694191 A1 *  2/2009  ......... G01N 29/0645
JP    S55146038 A    11/1980
(Continued)

OTHER PUBLICATIONS

International Search Report and Written Opinion of International Application No. PCT/JP2019/014994 mailed Jul. 2, 2019; 20pp.
(Continued)

*Primary Examiner* — John E Breene
*Assistant Examiner* — Rose M Miller
(74) *Attorney, Agent, or Firm* — HAUPTMAN HAM, LLP

(57) ABSTRACT

An ultrasonic testing device includes: a signal acquiring unit which receives a reflected echo signal relating to a reflected echo of ultrasonic waves from an object being inspected, a defect detecting unit which detects a defect of the object being inspected on the basis of the reflected echo signal, and a display unit which displays the detection result of the defect detecting unit. The defect detecting unit uses the maximum signal strength of the reflected echo signal exceeding a first threshold value to detect the defect. The first threshold value is a value with which the signal strength is less than the maximum signal strength of the reflected echo signal from the surface of the object, using as an evaluation range an interval between a position which is
(Continued)

positioned a first distance from the surface of the object and a bottom surface of the object.

9 Claims, 17 Drawing Sheets

(51) Int. Cl.
| | |
|---|---|
| *G01N 29/38* | (2006.01) |
| *G01N 29/40* | (2006.01) |
| *G01N 29/48* | (2006.01) |
| *G01S 7/52* | (2006.01) |
| *G01S 15/52* | (2006.01) |
| *G01S 15/89* | (2006.01) |

(52) U.S. Cl.
CPC ......... *G01N 29/40* (2013.01); *G01N 29/4445* (2013.01); *G01N 29/4463* (2013.01); *G01N 29/48* (2013.01); *G01S 7/52026* (2013.01); *G01S 7/5208* (2013.01); *G01S 15/526* (2013.01); *G01S 15/8906* (2013.01); *G01N 2291/044* (2013.01)

(58) Field of Classification Search
CPC .. G01N 29/48; G01N 29/38; G01N 2291/044; G01S 7/52026; G01S 15/8906; G01S 7/5208; G01S 15/526
USPC .......................................................... 73/602
See application file for complete search history.

(56) References Cited

U.S. PATENT DOCUMENTS

| | | | |
|---|---|---|---|
| 4,068,524 A | 1/1978 | Lewis et al. | |
| 4,432,235 A | 2/1984 | Renzel et al. | |
| 4,581,937 A * | 4/1986 | Lang | ...................... G01N 29/11 73/598 |
| 4,768,155 A | 8/1988 | Takishita et al. | |
| 5,426,978 A | 6/1995 | Imai | |
| 5,777,891 A | 7/1998 | Pagano et al. | |
| 2006/0123912 A1 | 6/2006 | Karasawa et al. | |
| 2015/0049580 A1 | 2/2015 | Skoglund et al. | |
| 2016/0231283 A1 | 8/2016 | Takemoto et al. | |
| 2020/0245977 A1* | 8/2020 | Hancock | ............ G01S 15/8927 |
| 2023/0050732 A1* | 2/2023 | Hancock | .............. A61B 8/4461 |

FOREIGN PATENT DOCUMENTS

| | | |
|---|---|---|
| JP | S61151458 A | 7/1986 |
| JP | S62240856 A | 10/1987 |
| JP | H01297551 A | 11/1989 |
| JP | H05004009 U | 1/1993 |
| JP | H06109711 A | 4/1994 |
| JP | H06138105 A | 5/1994 |
| JP | H06294778 A | 10/1994 |
| JP | H11337535 A | 12/1999 |
| JP | 2003294715 A | 10/2003 |
| JP | 2005031061 A | 2/2005 |
| JP | 2005156305 A | 6/2005 |
| JP | 2010019776 A | 1/2010 |
| JP | 2015081864 A | 4/2015 |
| JP | 2017129444 A | 7/2017 |
| WO | WO-2004111630 A1 * | 12/2004 ........... G01N 29/043 |

OTHER PUBLICATIONS

Extended European Search Report for European Application No. 19799501.2 mailed Mar. 9, 2021; 10pp.

Office Action for corresponding Japanese Application No. 2018-092257 mailed Apr. 19, 2022 (10 pp).

* cited by examiner

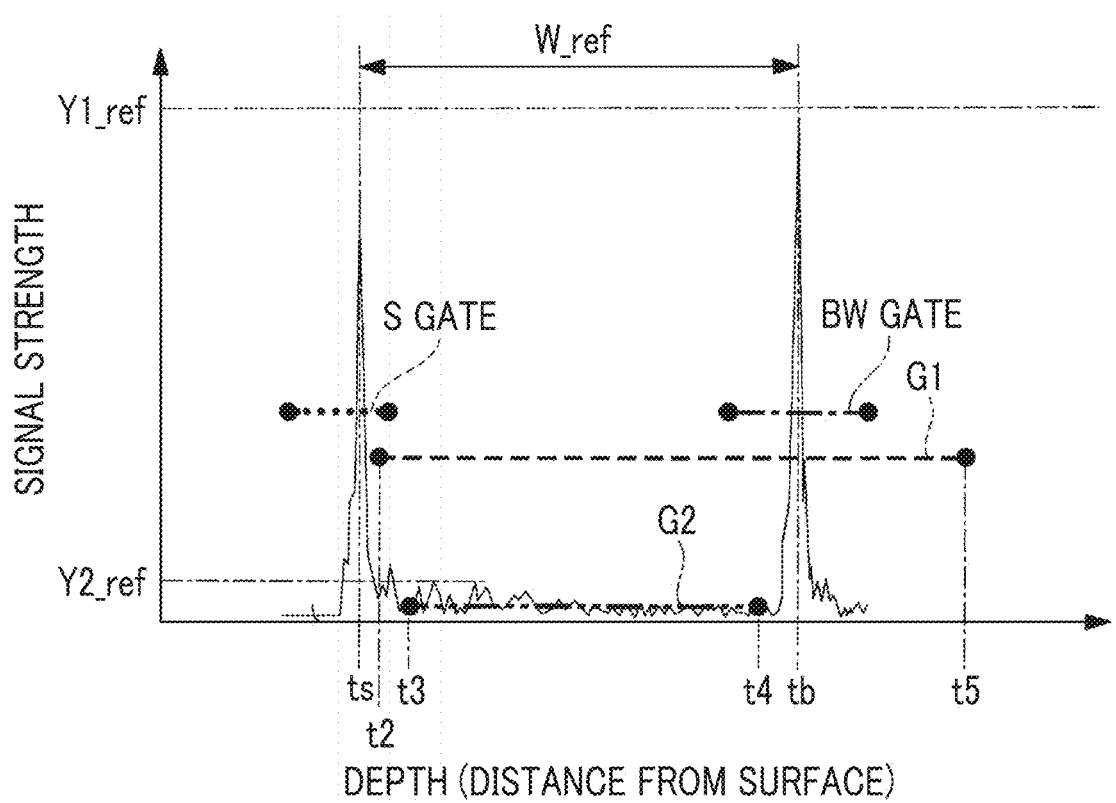

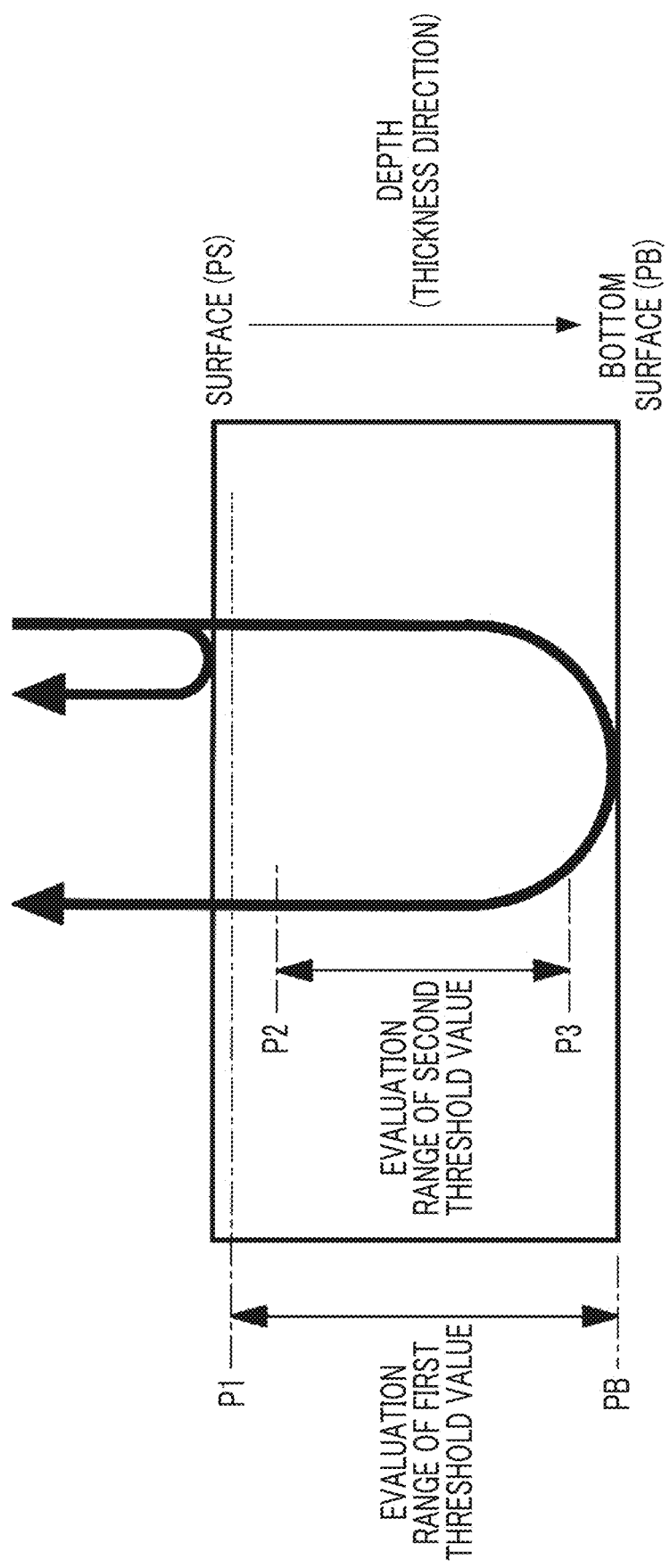

ULTRASONIC TESTING DEVICE, METHOD, PROGRAM, AND ULTRASONIC TESTING SYSTEM

RELATED APPLICATIONS

The present application is a National Phase of International Application Number PCT/JP2019/014994 filed Apr. 4, 2019 and claims priority to Japanese Application Number 2018-092257 filed May 11, 2018.

TECHNICAL FIELD

The present invention relates to an ultrasonic testing device, a method, a program, and an ultrasonic testing system.

BACKGROUND ART

Hitherto, a testing method using an ultrasonic wave is known as a method of testing a crack or the like occurring in a test object in a nondestructive manner.

For example, PTL 1 discloses a portable ultrasonic testing device that suitably moves a probe along a shape of a surface to be tested to detect a flaw inside a test object.

CITATION LIST

Patent Literature

[PTL 1] Japanese Unexamined Patent Application Publication No. 2015-81864

SUMMARY OF INVENTION

Technical Problem

Since an ultrasonic test is a special qualification operation, performance qualification is required for an operation, and a tester who performs the ultrasonic test is limited. For this reason, there is a possibility that it is hard to secure a qualified tester in a manufacturing site or a maintenance site in a timely manner, and a test standby state occurs over a long period.

In the ultrasonic test, since the qualified tester confirms an ultrasonic waveform and determines acceptance or rejection, not only quantitative evaluation is difficult, but also a lot of effort or time is required.

The invention has been accomplished in view of such a situation, and an object of the invention is to provide an ultrasonic testing device, a method, a program, and an ultrasonic testing system capable of reducing a time of an ultrasonic test and realizing quantitative evaluation.

Solution to Problem

A first aspect of the invention is an ultrasonic testing device including a signal acquisition unit that receives a reflected echo signal relating to a reflected echo from an ultrasonic probe, which irradiates an inside of a test object with an ultrasonic wave and receives the reflected echo from the test object, a defect detection unit that detects a defect of the test object based on the reflected echo signal, and a display unit that displays a detection result of the defect detection unit. The defect detection unit detects the defect of the test object using maximum signal strength of the reflected echo signal beyond a first threshold value. The first threshold value has an evaluation range between a first position at a first distance from a surface of the test object and a bottom surface of the test object, and signal strength of the first threshold value is set to a value smaller than maximum signal strength of a reflected echo signal from the surface.

With the ultrasonic testing device, the reflected echo signal in the test object is acquired by the signal acquisition unit, and defect detection of the defect detection unit is performed based on the reflected echo signal. The defect detection unit detects the defect of the test object using the maximum signal strength of the reflected echo signal beyond the first threshold value. In this case, the first threshold value has the evaluation range between the first position at the first distance from the surface of the test object and the bottom surface of the test object, and the signal strength of the first threshold value is set to the value smaller than the maximum signal strength of the reflected echo signal from the surface. For example, in a case where a defect is present inside the test object, a part of the ultrasonic waves, with which the inside of the test object is irradiated, is reflected by the defect, and a reflected echo of the ultrasonic waves is detected by the ultrasonic probe. The remaining ultrasonic waves not reflected by the defect are reflected from the bottom surface, and a reflected echo of the ultrasonic waves is detected by the ultrasonic probe. In this way, in a case where a defect is present inside the test object, a peak of the reflected echo signal generated at a time according to a depth, at which the defect is present. Accordingly, with the use of the first threshold value that has the evaluation range between the first position at the first distance from the surface of the test object and the bottom surface of the test object and of which the signal strength is set to the value smaller than the maximum signal strength of the reflected echo signal from the surface, it is possible to take a reflected echo reflected from a defect inside the test object, and to detect an internal defect.

With the ultrasonic testing device, since defect detection is automatically performed, it is possible to easily perform a test of the test object even though there is no qualified tester. Since human determination does not intervene in defect determination, it is possible to perform defect detection quantitatively.

The ultrasonic testing device may further include a signal amplification unit that amplifies the reflected echo signal using a distance-amplitude correction curve in which a signal amplification degree according to a distance from the surface in a depth direction is set. The defect detection unit may detect the defect of the test object using the reflected echo signal after signal amplification.

For example, as the thickness of test object is thicker, the signal strength of the reflected echo reflected from a defect or the bottom surface becomes weaker. With the ultrasonic testing device, since the reflected echo signal is amplified using the distance-amplitude correction curve in which the signal amplification degree according to the distance from the surface in the depth direction is set, it is possible to reduce attenuation of signal strength due to a propagation distance of an ultrasonic wave. With this, it is possible to increase the sensitivity of the reflected echo signal, and to improve the accuracy of defect detection of the test object.

In the ultrasonic testing device, the defect detection unit may detect the defect of the test object using maximum signal strength of the reflected echo signal beyond a second threshold value. The second threshold value may have an evaluation range between a second position at a second distance from the surface of the test object and a third position at a third distance from the bottom surface of the test object. The second position may be set to a position farther from the surface than the first position. Signal strength of the second threshold value may be set to a value smaller than the signal strength of the first threshold value.

For example, in a case where a defect is present inside the test object, a peak of the reflected echo signal is generated at a time according to a depth, at which the defect is present. Accordingly, with the use of the second threshold value that has the evaluation range between the second position set a position farther from the surface than the first position and the third distance at the third distance from the bottom surface of the test object, and of which the signal strength is set to the value smaller than the signal strength of the first threshold value, it is possible to take a reflected echo reflected from a defect inside the test object, and to detect an internal defect.

With the ultrasonic testing device, since defect detection is automatically performed, it is possible to easily perform a test of the test object even though there is no qualified tester. Since human determination does not intervene in defect determination, it is possible to perform defect detection quantitatively.

The ultrasonic testing device may further include an image creation unit that creates a C scan image from the reflected echo signal when the ultrasonic probe is moved along the surface of the test object and positional information where the reflected echo signal is obtained. The C scan image may include at least one of a first threshold value-based C scan image created based on a maximum amplitude value beyond the first threshold value in the reflected echo signal, a depth-based C scan image created based on a depth obtained from the reflected echo signal, or a second threshold value-based C scan image created based on a maximum amplitude value beyond the second threshold value in the reflected echo signal.

With the ultrasonic testing device, since at least one of the first threshold value-based C scan image created based on the maximum amplitude value beyond the first threshold value in the reflected echo signal, the depth-based C scan image created based on the depth obtained from the reflected echo signal, and the second threshold value-based C scan image created based on the maximum amplitude value beyond the second threshold value in the reflected echo signal is created by the image creation unit, it is possible to present such a C scan image to the tester, thereby easily notifying the tester of a defect detection position.

In the ultrasonic testing device, the image creation unit may add a masking region to surround an outer periphery of the C scan image, may specify a region, in which the reflected echo signal is not detected and which is in contact with the masking region, as a non-test region, and may display the specified non-test region in an aspect different from a test region.

With the ultrasonic testing device, it is possible to automatically detect the non-test region, and since the non-test region is displayed in an aspect different from the test region, it is possible to notify the tester of the non-test region and the test region clearly.

In the ultrasonic testing device, the defect detection unit may detect the defect of the test object using maximum signal strength of the reflected echo signal beyond a third threshold value. The third threshold value may have a predetermined distance defined between the surface of the test object and the first position as an evaluation range, and signal strength of the third threshold value may be set to a value smaller than the maximum signal strength of the reflected echo signal from the surface.

With the ultrasonic testing device, since the defect of the test object is detected using the third threshold value that has the predetermined distance defined between the surface of the test object and the first position decided as the evaluation range, it is possible to easily detect a defect that is present near the surface. Defect detection is performed using the third threshold value along with the first threshold value and the second threshold value, whereby it is possible to improve detection accuracy.

A second aspect of the invention is an ultrasonic testing device including an image creation unit that creates a C scan image from a reflected echo signal based on a reflected echo when an ultrasonic probe is moved along a surface of a test object and positional information where the reflected echo signal is obtained. The image creation unit adds a masking region to surround an outer periphery of the C scan image, specifies a region, in which the reflected echo signal is not detected and which is in contact with the masking region, as a non-test region, and displays the specified non-test region in an aspect different from a test region.

With the ultrasonic testing device, it is possible to automatically detect the non-test region, and since the non-test region is displayed in an aspect different from the test region, it is possible to notify the tester of the non-test region and the test region clearly.

A third aspect of the invention is an ultrasonic testing system including an ultrasonic probe and the above-described ultrasonic testing device.

A fourth aspect of the invention is an ultrasonic testing method including a signal acquisition step of receiving a reflected echo signal relating to a reflected echo from an ultrasonic probe, which irradiates an inside of a test object with an ultrasonic wave and receives the reflected echo from the test object, a defect detection step of detecting a defect of the test object based on the reflected echo signal, and a display step of displaying a detection result of the defect detection step. In the defect detection step, the defect of the test object is detected using maximum signal strength of the reflected echo signal beyond a first threshold value. The first threshold value has an evaluation range between a first position at a first distance from a surface of the test object and a bottom surface of the test object, and signal strength of the first threshold value is set to a value smaller than maximum signal strength of a reflected echo signal from the surface.

A fifth aspect of the invention is an ultrasonic testing program causing a computer to execute ultrasonic test processing of detecting a defect of a test object. The ultrasonic testing program includes signal acquisition processing of receiving a reflected echo signal relating to a reflected echo from an ultrasonic probe, which irradiates an inside of a test object with an ultrasonic wave and receives the reflected echo from the test object, defect detection processing of detecting a defect of the test object based on the reflected echo signal, and display processing of displaying a detection result of the defect detection processing. In the defect detection processing, the defect of the test object is detected using maximum signal strength of the reflected echo signal beyond a first threshold value. The first threshold value has an evaluation range between a first position at a first distance from a surface of the test object and a bottom surface of the test object, and signal strength of the first threshold value is set to a value smaller than maximum signal strength of a reflected echo signal from the surface.

Advantageous Effects of Invention

It is possible to reduce a time of an ultrasonic test, and to realize quantitative evaluation.

BRIEF DESCRIPTION OF DRAWINGS

FIG. 7 is a diagram illustrating a first threshold value, a second threshold value, a first reference value, a second reference value, and a reference depth according to the embodiment of the invention.

FIG. 8 is a diagram illustrating evaluation ranges of the first threshold value and the second threshold value according to the embodiment of the invention.

Figure 1:
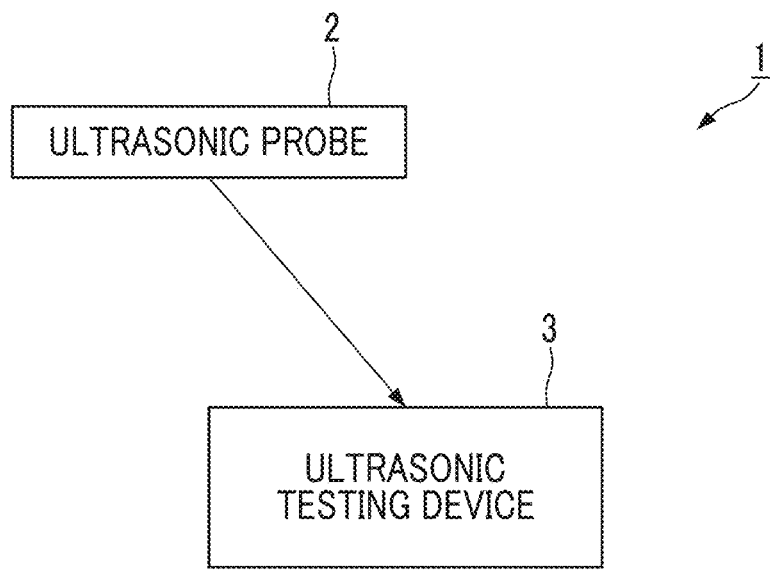
FIG. 1 is a diagram showing the overall configuration of an ultrasonic testing system according to an embodiment of the invention.

Hereinafter, an embodiment of an ultrasonic testing device, a method, program, and an ultrasonic testing system according to the invention will be described referring to the drawings.

FIG. 1 is a diagram showing the schematic configuration of an ultrasonic testing system 1 according to the embodiment of the invention. In FIG. 1, the ultrasonic testing system 1 includes an ultrasonic probe 2 and an ultrasonic testing device 3.

An aspect of the ultrasonic probe 2 is, for example, a handheld probe that is held by a tester with a hand and used, and the tester manually moves the ultrasonic probe 2 on a surface of a test object to be measured in a site. Another aspect of the ultrasonic probe 2 is, for example, a fixed probe attached to a scanner, which automatically moves on the surface of the test object. In the embodiment, a handheld probe is exemplified.

The ultrasonic probe 2 performs irradiation of ultrasonic waves into the test object, receives a reflected echo returned from a test object, and outputs an output signal (hereinafter, referred to as a "reflected echo signal") relating to the received reflected echo to the ultrasonic testing device 3.

The ultrasonic probe 2 may be a vertical probe that transmits an ultrasonic beam vertically incident on a surface (flaw detection surface) of the test object or may be a beveled probe that transmits an ultrasonic beam at an angle different from perpendicular with respect to the surface of the test object.

As the ultrasonic probe 2, a known probe may be appropriately employed, and detailed description thereof will not be repeated. For example, a phased array probe, a wheel type (tire type) probe, or the like is exemplified as an example.

The ultrasonic probe 2 of the embodiment includes a probe movement distance measurement unit (not shown) that can create an internal scope image (for example, a B scope image, a C scope image, or the like). The probe movement distance measurement unit is constituted of an encoder attached to the ultrasonic probe 2. A pulse according to a movement amount of the ultrasonic probe 2 is output from the encoder, whereby the ultrasonic testing device 3 can associate a test position in the test object with a reflected echo signal.

The ultrasonic testing device 3 tests the inside of the test object based on the reflected echo signal received from the ultrasonic probe 2 and displays a test result on the display unit, or the like to notify the tester of the test result. An aspect of the ultrasonic testing device 3 is, for example, a portable terminal. The tester holds the ultrasonic probe 2 with one hand and moves the ultrasonic probe 2 along the surface of the test object. The tester holds the portable ultrasonic testing device 3 with the other hand and confirms the screen of the portable ultrasonic testing device 3. With this, it is possible to allow the tester to confirm the display screen of the ultrasonic testing device 3 while performing a test, thereby confirming a test result in real time. Another aspect of the ultrasonic testing device 3 is, for example, an installation type information processing device. The ultrasonic testing device 3 receives a reflected echo signal when the tester holds and moves the ultrasonic probe 2 on the surface of the test object and processes the received reflected echo signal in real time or later, thereby displaying a test result of the test object on the display screen in real time or later.

Figure 2:
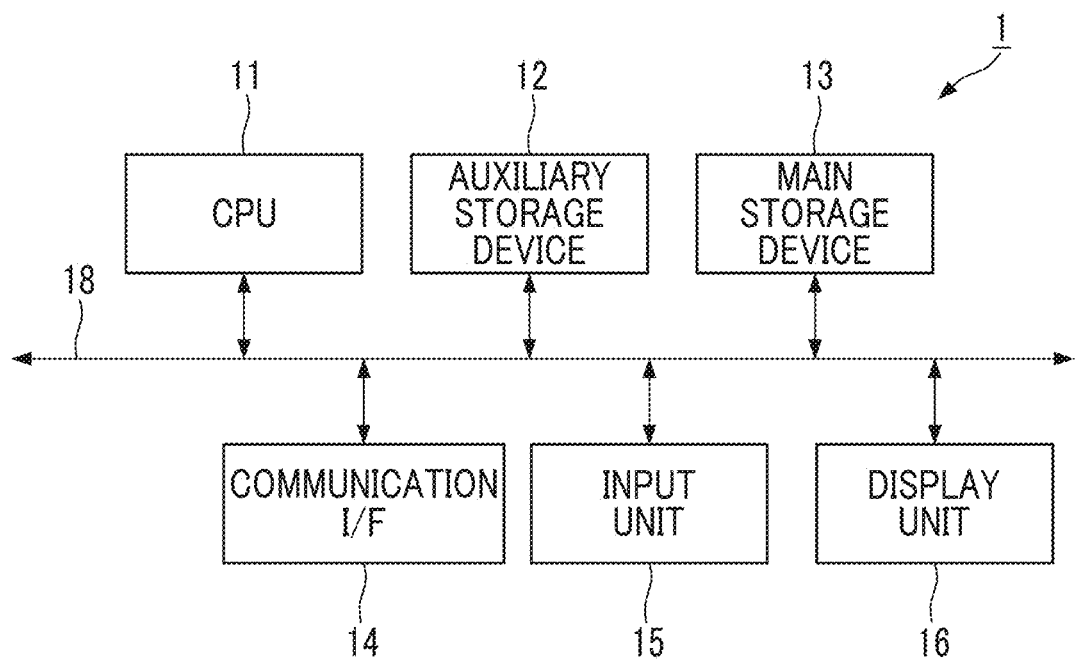
FIG. 2 is a schematic configuration diagram showing an example of the hardware configuration of an ultrasonic testing device according to the embodiment of the invention.

FIG. 2 is a schematic configuration diagram showing an example of the hardware configuration of the ultrasonic testing device 3 according to the embodiment of the invention. As shown in FIG. 2, the ultrasonic testing device 3 has a computer (computer system), and includes, for example, a CPU 11, an auxiliary storage device 12 that stores programs to be executed by the CPU 11, data to be referred to by the programs, and the like, a main storage device 13 that functions as a work area when each program is executed, a communication interface 14 for connection to a network, an input unit 15, such as a keyboard, a mouse, or a stylus pen, a display unit 16 that displays data, such as a liquid crystal display, and the like. The units are connected, for example, through a bus 18. As the auxiliary storage device 12, for example, a magnetic disk, a magneto-optical disk, a semiconductor memory, or the like is exemplified as an example.

A series of processing for realizing various functions described below is stored in the auxiliary storage device 12 in a format of a program (for example, an ultrasonic testing program) as an example. Various functions are realized by the CPU 11 reading the program to the main storage device 13 and executing information processing and arithmetic processing. For the program, a form in which the program is installed in the auxiliary storage device 12 in advance, a form in which the program is provided in a state stored in another computer-readable storage medium, a form in which the program is distributed through communication means by wire or wireless, or the like may be applied. The computer-readable storage medium is a magnetic disk, a magneto-optical disk, a CD-ROM, a DVD-ROM, a semiconductor memory, or the like.

Figure 3:
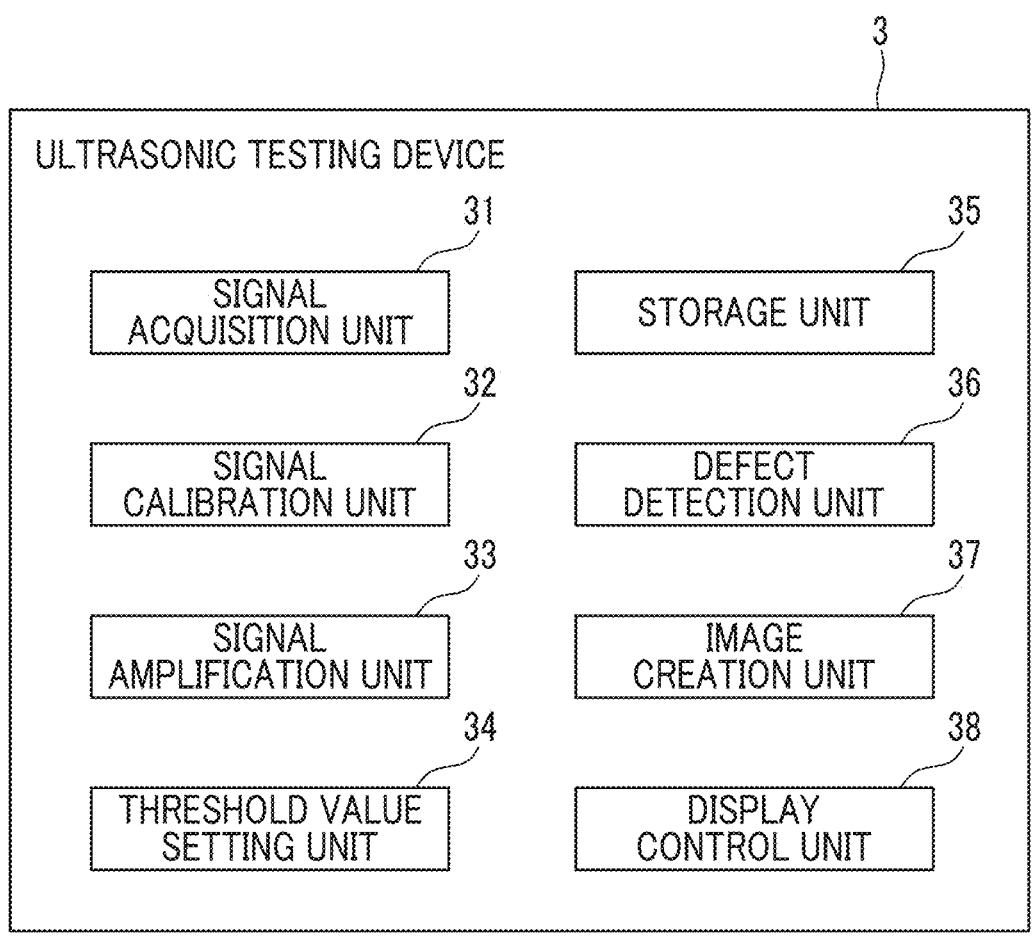
FIG. 3 is a functional block diagram showing an example of functions of the ultrasonic testing device according to the embodiment of the invention.

FIG. 3 is a functional block diagram showing an example of functions of the ultrasonic testing device 3 according to the embodiment. As shown in FIG. 3, the ultrasonic testing device 3 includes a signal acquisition unit 31, a signal calibration unit 32, a signal amplification unit 33, a threshold value setting unit 34, a storage unit 35, a defect detection unit 36, an image creation unit 37, a display control unit 38, and the like.

The signal acquisition unit 31 is, for example, a communication unit, and receives a reflected echo signal output from the ultrasonic probe 2 through a predetermined communication medium and outputs the reflected echo signal to the signal calibration unit 32 or the like. The predetermined communication medium may be a wired type or a wireless type. The predetermined communication medium may be means that can realize transmission and reception of signals to and from the ultrasonic probe 2, and is not particularly limited.

The signal calibration unit 32 executes predetermined calibration processing. For example, in a case where the ultrasonic probe 2 is constituted of a plurality of sensor elements, the signal calibration unit 32 executes processing of making variation of reflected echo signals received by the respective elements uniform. For example, the signal calibration unit 32 executes offset processing of signal strength among the sensor elements such that a difference in amplitude among the reflected echo signal received by the respective sensor elements constituting the ultrasonic probe 2 falls within an allowable range. Various kinds of calibration processing in the signal calibration unit 32 are known techniques, and detailed description thereof will not be repeated.

Figure 4:
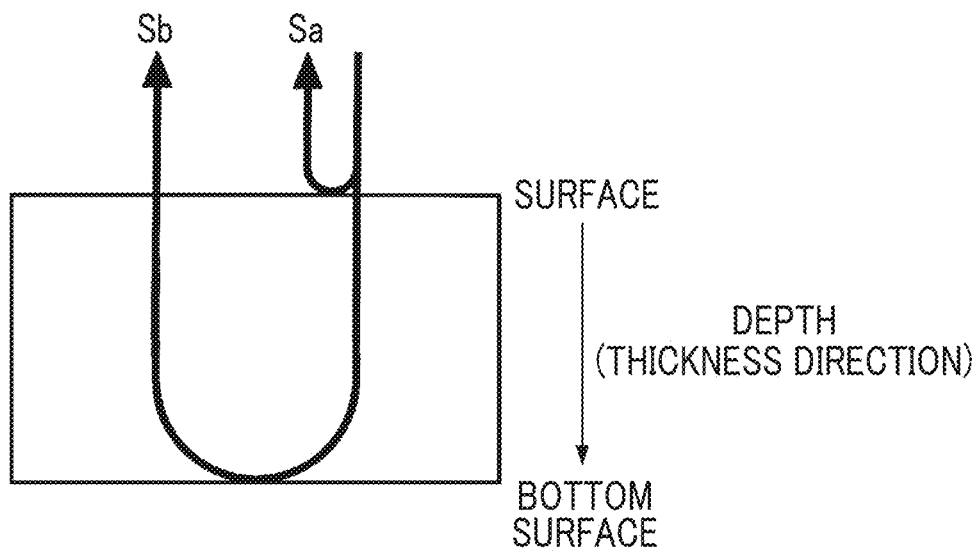
FIG. 4 is a diagram illustrating a surface reflected echo that is reflected from a surface and a bottom surface that is reflected echo reflected from a bottom surface.
Figure 5:
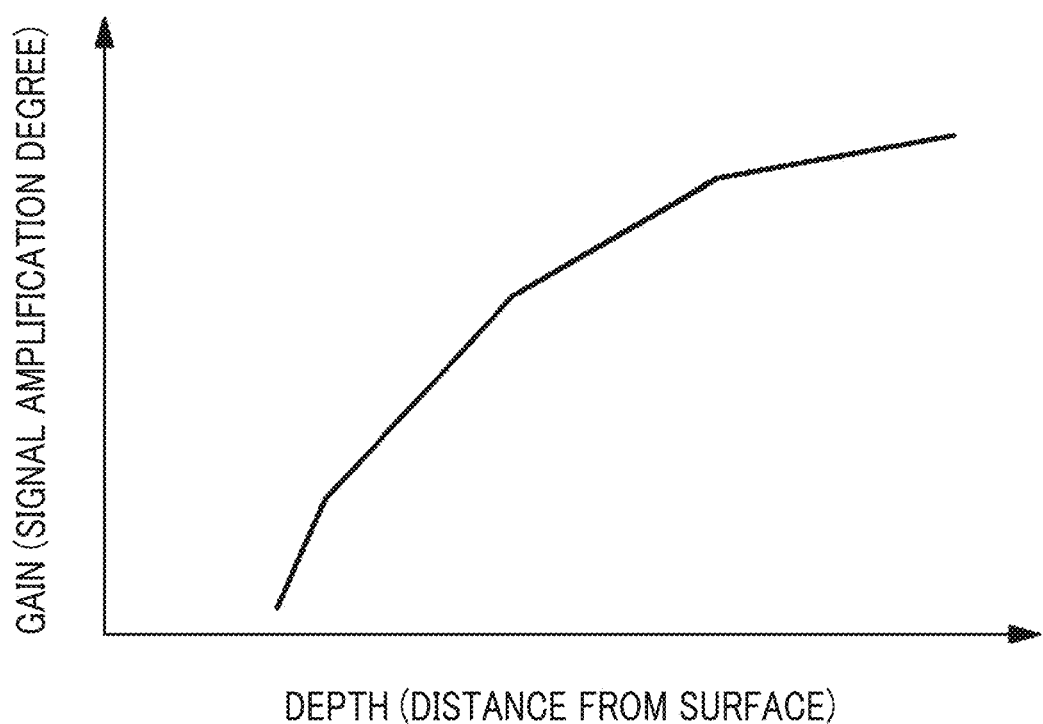
FIG. 5 is a diagram showing an example of distance-amplitude correction information according to the embodiment of the invention.

The signal amplification unit 33 executes amplification processing of amplifying a waveform of each reflected echo signal in a thickness direction using distance-amplitude correction information in which a distance (depth) from the surface of the test object in the thickness direction is associated with a signal amplification degree. For example, as shown in FIG. 4, the signal strength of a reflected echo (hereinafter, referred to as a "surface reflected echo") Sa reflected from a surface and the strength signal of a reflected echo (hereinafter, referred to as a "bottom surface reflected echo") Sb reflected from a bottom surface becomes greater as the thickness of the test object is thicker. This is because the thicker the thickness of the test object, the longer a movement distance of an ultrasonic wave inside the test object, and the signal is attenuated as much. Accordingly, in order to reduce attenuation of signal strength due to the thickness, the signal amplification unit 33 amplifies the reflected echo signal using distance-amplitude correction information shown in FIG. 5 in which the distance from the surface is associated with a gain (signal amplification degree).

Figure 6A:
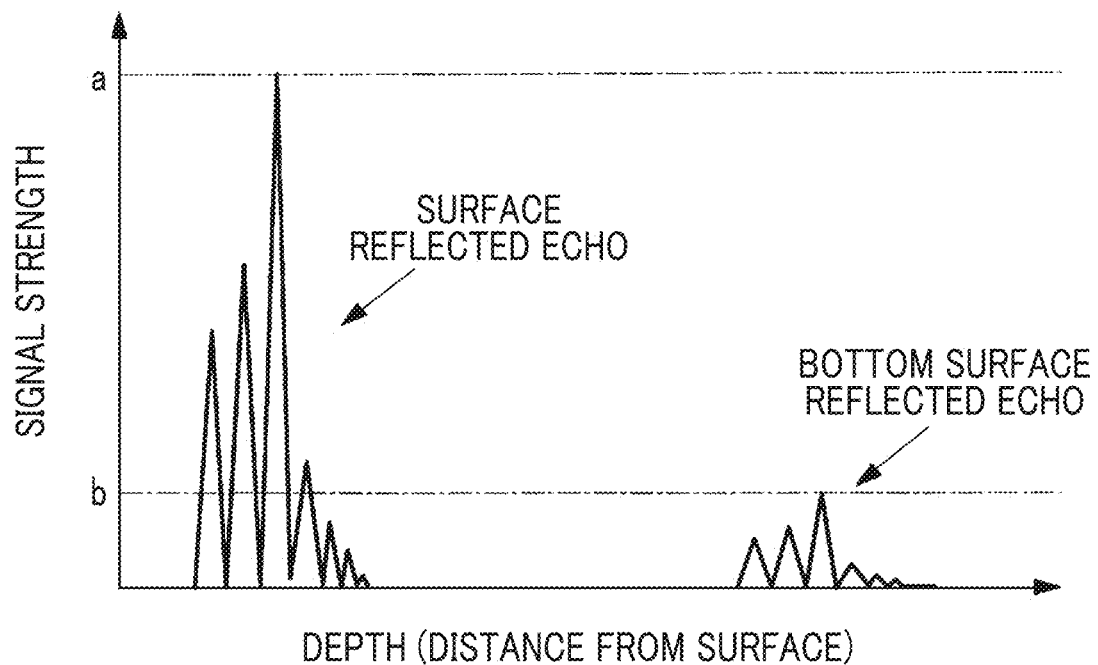
FIG. 6A is a diagram showing an example of an A scope image of a reflected echo signal, and is a diagram showing an A scope image before signal amplification processing is executed.
Figure 6B:
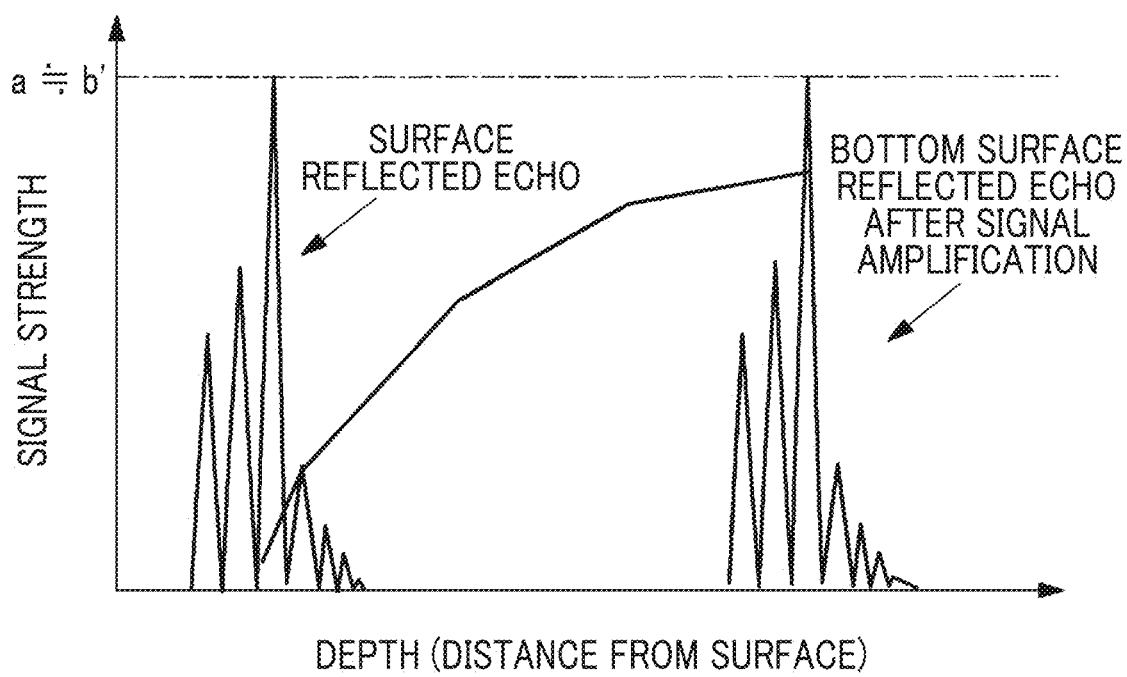
FIG. 6B is a diagram showing an example of an A scope image of a reflected echo signal, and is a diagram showing an A scope image after the signal amplification processing is executed.

For example, an A scope image of a reflected echo signal is shown in FIGS. 6A and 6B. In the A scope image shown in FIGS. 6A and 6B, the horizontal axis indicates time, in other words, the depth (the distance from the surface), and the vertical axis indicates signal strength. FIG. 6A shows an example of an A scope image of a reflected echo signal before signal amplification processing is executed, and FIG. 6B shows an example of an A scope image of a reflected echo signal after the signal amplification processing is executed. As shown in FIG. 6A, a maximum amplitude value b of the bottom surface reflected echo Sb is a value slightly smaller than a maximum amplitude value a of the surface reflected echo Sa before the signal amplification processing. In contrast, signal amplification is performed using the distance-amplitude correction information, whereby a maximum amplitude value b' of the bottom surface reflected echo Sb can be made to be the substantially same level as the maximum amplitude value a of the surface reflected echo Sa as shown in FIG. 6B. With this, it is possible to suppress attenuation of signal strength due to a signal propagation distance.

The distance-amplitude correction information is created as follows.

For example, a plurality of specimens that are created with the same material as the test object and are different in thickness (for example, specimens of which the thickness is changed in increments of 2 mm) are prepared in advance, and reflected echo signals when the respective specimens are irradiated with ultrasonic waves from the ultrasonic probe 2 are obtained. Then, for each specimen, the signal amplification degree with which the maximum amplitude value (maximum signal strength) of the bottom surface reflected echo is made to coincide with the maximum amplitude value (maximum signal strength) of the surface reflected echo is calculated, and the thickness (the distance from the surface=the depth) is associated with the amplification degree to create the distance-amplitude correction information. The distance-amplitude correction information created in this way is stored in a predetermined storage area (for example, the storage unit 35) before a test of the test object is performed by the ultrasonic testing device 3 and is used at the time of acquisition of a reference signal described below, during the test, or the like.

The distance-amplitude correction information may be provided as a table or may be provided an arithmetic expression with the thickness (the distance from the surface) as a variable.

The threshold value setting unit 34 sets a first threshold value, a second threshold value, and the like for detecting a defect inside the test object using a reflected echo signal (hereinafter, referred to as a "reference signal") of a specimen simulating the normal test object.

For example, an example of an A scope image based on a reflected echo signal of a specimen is shown in FIG. 7. The A scope image shows a signal waveform after the signal amplification processing of the signal amplification unit 33 is executed.

The threshold value setting unit 34 specifies a surface reflected echo and a bottom surface reflected echo in the A scope image of the reference signal shown in FIG. 7, and sets a first threshold value G1 and a second threshold value G2 for detecting a defect of the test object based on the surface reflected echo and the bottom surface reflected echo.

For example, the threshold value setting unit 34 sets an S gate for detecting the surface reflected echo and a BW gate for detecting the bottom surface reflected echo. Here, in the setting before the test, the BW gate is set a distance from immediately after the surface (for example, immediately after an end point of the S gate) to beyond the bottom surface, and after the bottom surface reflected echo is specified, as shown in FIG. 7, a gate width is adjusted to be short according to a distance range where the bottom surface reflected echo is present. In this way, the width of the BW gate is adjusted to be short, whereby it is possible to suppress detection of noise due to the BW gate.

Then, a timing at which a waveform of maximum signal strength is generated in a time range where the S gate is set is defined as a surface detection time ts. A timing at which a waveform of maximum signal strength is generated in a time range where the BW gate is set is defined as a bottom surface detection time tb.

Instead of a case where the surface detection time ts and the bottom surface detection time tb are automatically specified as described above, for example, the A scope image shown in FIG. 7 may be displayed on the display unit 16, and the tester performs an input for designating designate the surface detection time ts and the bottom surface detection time tb through the input unit 15, thereby specifying the surface reflected echo, the bottom surface reflected echo, the surface detection time ts, and the bottom surface detection time tb.

The threshold value setting unit 34 sets the first threshold value G1 with an evaluation time from a time t2 delayed for a first time from the surface detection time ts to a time t5 when the bottom surface reflected echo is not detected. The first threshold value G1 is set to signal strength smaller than the signal strength of the S gate, and is set to such signal strength that noise is not picked up. For example, the first threshold value G1 is set in a range greater than 0% and equal to or less than 50% in a case where the maximum signal strength (maximum amplitude value) of the surface reflected echo is defined as 100%.

The threshold value setting unit 34 sets the second threshold value G2 with an evaluation time from a time t3 when the surface reflected echo is not detected to a time t4 when the bottom surface reflected echo signal is started to be detected. The second threshold value G2 is set to signal strength smaller than the first threshold value G1. For example, the second threshold value G2 is set to such signal strength that noise is picked up, and is set in a range greater than 0% and equal to or less than 20% as an example in a case where the maximum signal strength of the surface reflected echo signal is defined as 100%.

With this, as shown in FIG. 8, the first threshold value G1 is set such that an evaluation range is between a first position P1 at a first distance from a surface PS of the test object and a bottom surface PB of the test object. The second threshold value G2 is set such that an evaluation range is between a second position P2 at a second distance from the surface of the test object and a third position P3 at a third distance from the bottom surface of the test object. Here, the distance from the surface PS to each position has a relationship of PS (surface)<P1<P2<P3<PB (bottom surface).

Subsequently, the threshold value setting unit 34 compares the reference signal with the first threshold value G1, detects the maximum amplitude value from the waveform beyond the first threshold value G1, and defines the maximum amplitude value as a first reference value Y1_ref. The threshold value setting unit 34 detects a time from the surface detection time ts to the bottom surface detection time tb when the first reference value Y1_ref is indicated, and defines a distance (depth) corresponding to the time as a reference depth W_ref.

The threshold value setting unit 34 compares the reference signal with the second threshold value G2, detects the maximum amplitude value in the waveform beyond the second threshold value G2, and defines the maximum amplitude value as a second reference value Y2_ref.

The first threshold value G1, the second threshold value G2, the first reference value Y1_ref, the second reference value Y2_ref, and the reference depth W_ref obtained in the above-described manner are stored in the storage unit 35 and are used for defect detection of the test object.

The defect detection unit 36 detects a defect of the test object based on the reflected echo signal of the test object acquired by the signal acquisition unit 31 in the test of the test object.

For example, the reflected echo signal of the test object is compared with the first threshold value G1, the maximum amplitude value (hereinafter, referred to as a "first measured value Y1") is detected from the waveform beyond the first threshold value G1, and the first measured value Y1 is compared to the first reference value Y1_ref, thereby detecting an internal defect.

Figure 9:
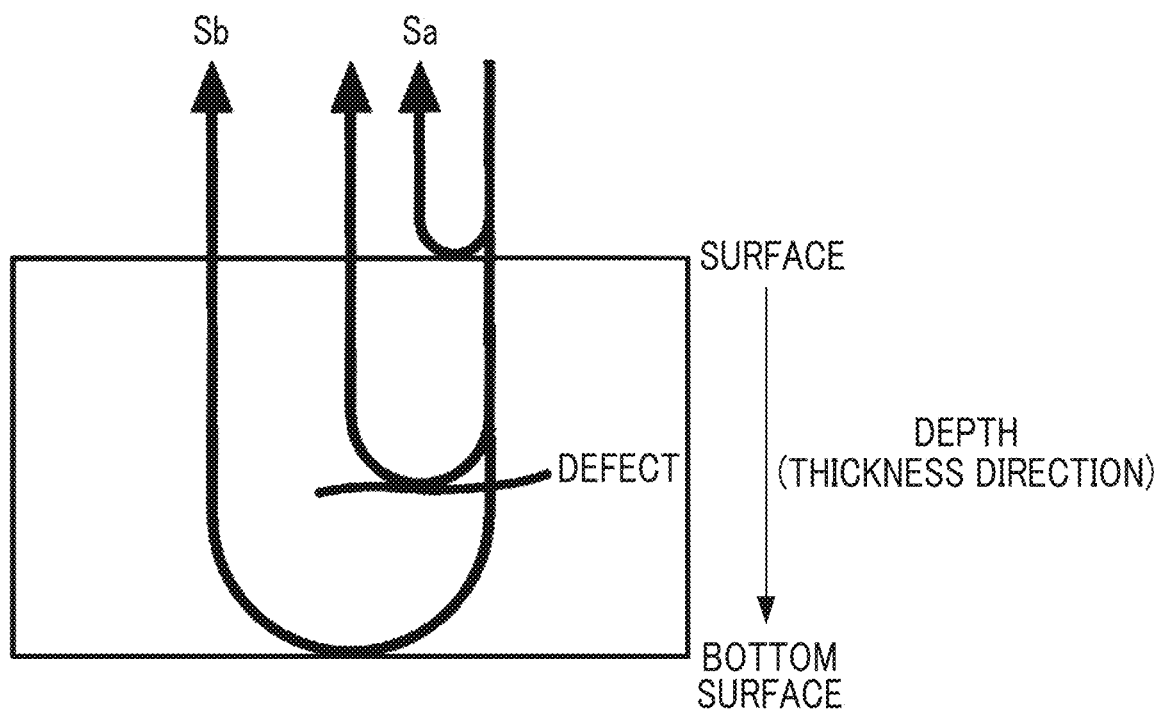
FIG. 9 is a diagram illustrating a reflected echo in a case where a defect is present inside a test object.
Figure 10:
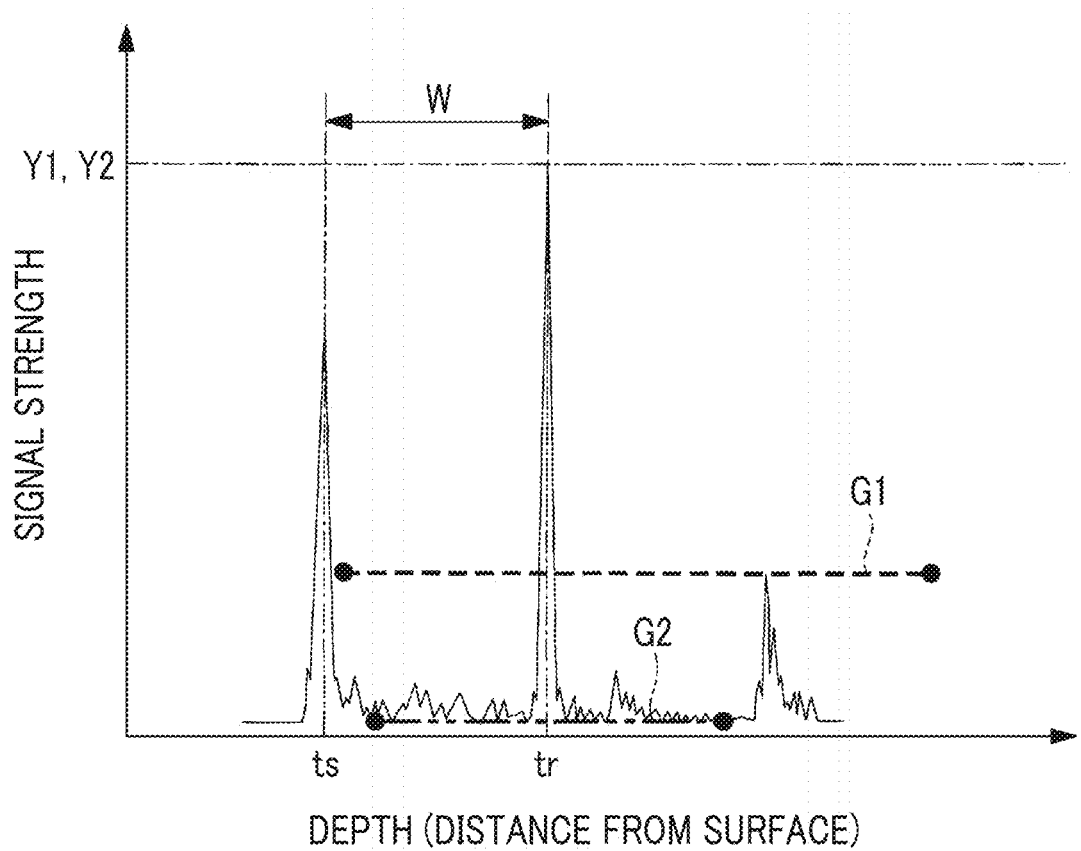
FIG. 10 is a diagram showing an example of an A scope image of a reflected echo signal after signal amplification processing in a case where a defect is present inside the test object.

For example, as shown in FIG. 9, in a case where a defect is present inside the test object, a part of ultrasonic waves is reflected by the defect, and a reflected echo of the ultrasonic waves is detected by the ultrasonic probe 2. The remaining ultrasonic waves not reflected by the defect are reflected from the bottom surface, and a reflected echo of the ultrasonic waves is detected by the ultrasonic probe 2. In this way, in a case where a defect is present inside the test object, a peak of the reflected echo signal is generated at a time according to a depth, at which the defect is present. For example, an example of an A scope image of a reflected echo signal after the signal amplification processing in a case where an internal defect is present is shown in FIG. 10. In this way, in a case where a defect is present inside the test object, a waveform having signal strength beyond the first threshold value G1 is generated between the surface reflected echo and the bottom surface reflected echo compared to the A scope image of the normal specimen shown in FIG. 7. Since the reflected echo from the defect becomes a reflected echo from a position shallower than the bottom surface, the signal strength of the reflected echo indicates a value greater than the signal strength (for example, the first reference value Y1_ref) of the bottom surface reflected echo.

Accordingly, the first measured value Y1 is compared with the first reference value Y1_ref, and in a case where an absolute value of a difference between the first measured value Y1 and the first reference value Y1_ref exceeds a predetermined allowable value, determination can be made that an internal defect is present.

The absolute values of the first measured value Y1 and the first reference value Y1_ref may be compared with each other or evaluation may be performed using decibels. For example, in a case where evaluation is performed using decibels, an internal defect may be detected according to whether or not an absolute value of a first evaluation value J1 (decibels) shown in Expression (1) described below exceeds a predetermined threshold value set in advance. The following evaluation expression is an example, and can be appropriately changed.

$$J1 = 20\log_{10}\left(\frac{Y1}{Y1\_ref}\right) \quad (1)$$

As will be understood from the A scope image shown in FIG. 10, in a case where a defect is present inside the test object, a peak of the reflected echo is generated at a time tr according to the depth, at which the defect is present. For this reason, with comparison of a depth W according to a time (tr-ts) from the surface to the peak with the reference depth W_ref, determination can be made whether a waveform indicating the peak is a reflected echo from the bottom surface or a reflected echo from the internal defect. Accordingly, the depth W from the surface is calculated from the time tr when the maximum amplitude is indicated in the waveform beyond the first threshold value G1, and in a case where a difference between the calculated depth W and the reference depth W_ref of the normal test object exceeds a predetermined allowable value, determination can be made that an internal defect is present.

For example, as will be understood from the A scope image shown in FIG. 10, in a case where a defect is present inside the test object, a waveform having signal strength far beyond the second threshold value G2 is generated between the reflected echo from the surface and the reflected echo from the bottom surface. In contrast, in the reflected echo signal (reference signal) of the normal specimen shown in FIG. 7, the waveform generated between the surface reflected echo and the bottom surface reflected echo indicates signal strength not much different from the second threshold value G2, and there is a large difference in waveform of the surface reflected echo and the bottom surface reflected echo between a normal state and an abnormal state. Accordingly, the maximum amplitude value (hereinafter, referred to as a "second measured value Y2") of the waveform beyond the second threshold value G2 in the reflected echo signal of the test object is compared with the second reference value Y2_ref, and in a case where an absolute value of a difference between the second measured value Y2 and the second reference value Y2_ref exceeds a predetermined allowable value, determination can be made that an internal defect is present.

The absolute values of the second measured value Y2 and the second reference value Y2_ref may be compared or evaluation may be performed using decibels. For example, in a case where evaluation is performed using decibels, an internal defect may be detected according to whether or not a second evaluation value J2 shown in Expression (2) described below exceeds a predetermined threshold value. The following evaluation expression is an example, and can be appropriately changed.

$$J2 = 20\log_{10}\left(\frac{Y2}{Y2\_ref}\right) \quad (2)$$

As described above, the defect detection unit 36 executes first defect detection processing of detecting a defect based on the first measured value Y1 acquired from the reflected echo signal of the test object and the first reference value Y1_ref, second defect detection processing of detecting a defect based on the depth W acquired from the reflected echo signal of the test object and the reference depth W_ref, and third defect detection processing of detecting a defect based on the second measured value Y2 acquired from the reflected echo signal of the test object and the second reference value Y2_ref, in a case where a defect is detected in at least one kind of defect detection processing, determines that a defect is present, and outputs a signal indicating the effect to the image creation unit 37 and the display control unit 38.

Figure 11:
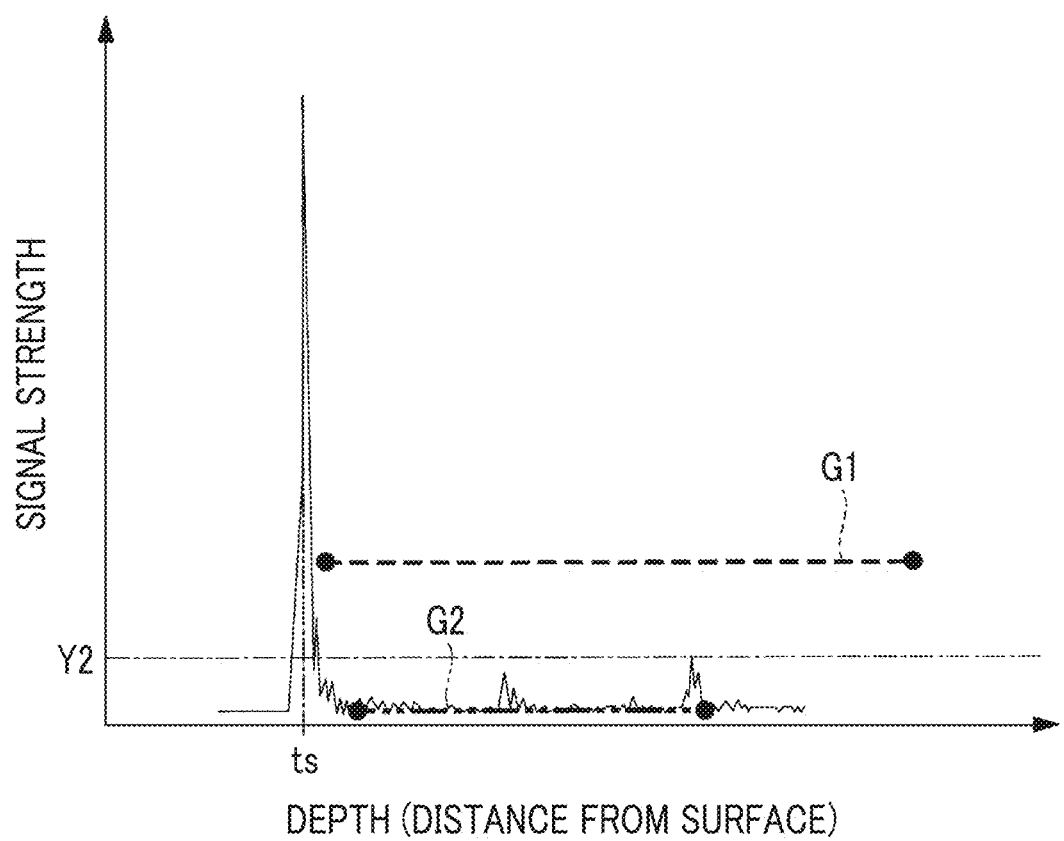
FIG. 11 is a diagram showing an example of an A scope image of a reflected echo signal after signal amplification processing in a case where a defect is present in a surface of the test object.

In the above description, although a case where a defect is present inside the test object has been exemplified and described, with the first to third defect detection processing, a defect can be detected even though a defect is generated in the surface of the test object. For example, an example of an A scope image of a reflected echo signal in a case where a defect is present in the surface is shown in FIG. 11. As shown in FIG. 11, in a case where a defect is present in the surface, while the amplitude of the surface reflected echo becomes higher than a normal state, a waveform beyond the first threshold value G1 is not present in the bottom surface and in a depth region to the bottom surface. For this reason, the first measured value Y1 is not detected, the absolute value of the first evaluation value J1 exceeds the threshold value, and an abnormality is detected in the first defect detection processing. Since the depth W is also not detected, an abnormality is also detected in the second defect detection processing. In the third defect detection processing, since the signal strength of the waveform beyond the second threshold value G2 indicates the substantially same value as in the normal state, an abnormality is not detected. In this way, even though a defect is generated in the surface, an abnormality can be reliably detected with the first defect detection processing and the second defect detection processing.

The image creation unit 37 creates a C scan image based on the reflected echo signal of the test object and makes the display unit 16 display the created image.

For example, a reflected echo signal when the ultrasonic probe 2 is moved along the surface of the test object and positional information are input from the signal acquisition unit 31, the image creation unit 37 compares the reflected echo signal with the first threshold value G1 and detects the maximum amplitude value beyond the first threshold value G1. Then, the C scan image based on the first threshold value G1 is created by displaying a pixel corresponding to each test position with a gray value according to the detected maximum amplitude value. Since the acquired maximum amplitude value is the same value as the first measured value Y1 detected by the defect detection unit 36, the first measured value Y1 obtained by the defect detection unit 36 may be used.

Figure 12:
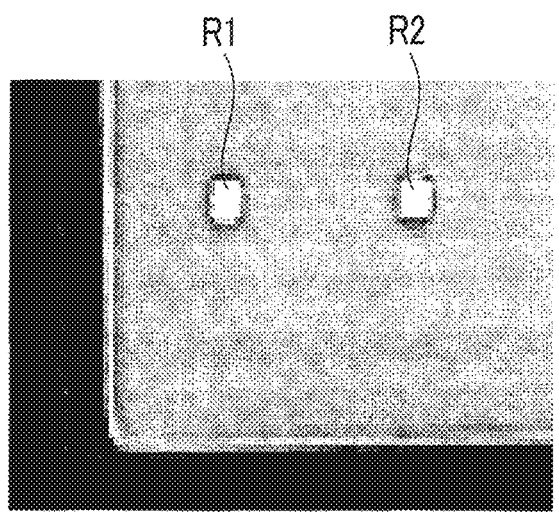
FIG. 12 is a diagram showing an example of a C scan image based on the first threshold value in a case where a defect is present inside the test object.
Figure 13:
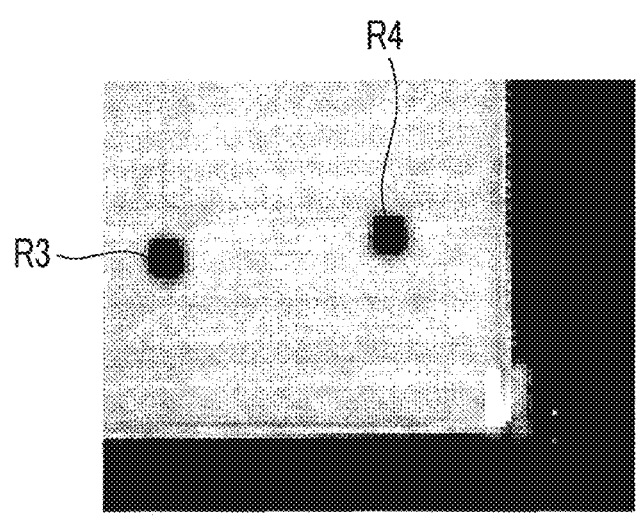
FIG. 13 is a diagram showing an example of a C scan image based on the first threshold value in a case where a defect is present in the surface of the test object.

For example, the image creation unit 37 has information for converting the maximum amplitude value (first measured value Y1) into a gray value (gradient 0 to 255) and acquires the gray value according to the maximum amplitude value using information. For example, an example of the C scan image based on the first threshold value G1 is shown in FIGS. 12 and 13. In the C scan image based on the first threshold value G1 shown in FIG. 12 and FIG. 13, a case where the gradation value is greater as the maximum amplitude value is greater, that is, more nearly black display is performed as the maximum amplitude value is smaller, and more nearly white display is performed as the maximum amplitude value is greater is exemplified. For example, as in the A scope image shown in FIG. 7, a normal test position where an internal defect does not occur is displayed with the gradient near the first reference value Y1_ref since the maximum amplitude value near the first reference value Y1_ref is indicated. On the other hand, in a case where an internal defect with strong signal strength occurs, as in the A scope image shown in FIG. 10, the maximum amplitude value beyond the first threshold value G1 has a value greater than in the normal state. Accordingly, as shown in regions R1 and R2 of FIG. 12, a test position where an internal defect is generated is represented by the gradient (color near white) higher than a normal place.

In a case where a defect occurs in the surface, for example, as in the A scope image shown in FIG. 11, the maximum amplitude value beyond the first threshold value G1 is not present. For this reason, the gradient is represented by a value indicating no data, for example, a lowest value (for example, zero). Accordingly, as shown in FIG. 13, test positions R3 and R4 where a surface defect occurs are displayed in more nearly black than a normal place.

In this way, the C scan image based on the first threshold value G1 is displayed on the display unit 16, whereby it is possible to allow the tester to easily recognize a position where an internal defect is generated.

In a case where a reflected echo signal when the ultrasonic probe 2 is moved along the surface of the test object and positional information are input from the signal acquisition unit 31, the image creation unit 37 creates a C scan image according to the second threshold value G2 based on the reflected echo signal and the second threshold value G2. For example, the image creation unit 37 compares the reflected echo signal with the second threshold value G2 and detects the maximum amplitude value beyond the second threshold value G2. Then, the C scan image based on the second threshold value G2 is created by displaying a pixel at each position with a gray value according to the detected maximum amplitude value.

Since the acquired maximum amplitude value is the same value as the second measured value Y2 detected by the defect detection unit 36, the second measured value Y2 obtained by the defect detection unit 36 may be used.

For example, the image creation unit 37 has information for converting the maximum amplitude value (second measured value Y2) into a gray value (gradation value) and acquires the gray value according to the maximum amplitude value using information. Then, the C scan image based on the second threshold value G2 is created by representing a position, at which each reflected echo signal is acquired, with a gray value corresponding to the maximum amplitude value.

Figure 14:
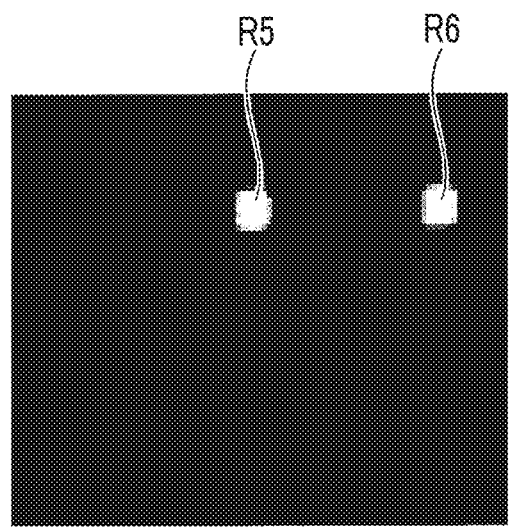
FIG. 14 is a diagram showing an example of a C scan image based on the second threshold value in a case where a defect is present inside the test object.

For example, an example of the C scan image based on the second threshold value G2 is shown in FIG. 14. In the C scan image based on the second threshold value G2 shown in FIG. 14, a case where the gradation value is greater as the maximum amplitude value is greater, that is, a test position is represented with a gradient nearer black as the maximum amplitude value is greater, and a test position is represented with a gradient nearer white as the maximum amplitude value is greater is exemplified. For example, as in the A scope image shown in FIG. 7, a normal test position where an internal defect does not occur is displayed with a gradient (that is, a gradient close to zero) near the second reference value Y2_ref since the maximum amplitude value near the second reference value Y2_ref is indicated.

On the other hand, in a case where an internal defect occurs, as in the A scope image shown in FIG. 10, the maximum amplitude value beyond the second threshold value G2 has a value extremely greater than in the normal state. Accordingly, as shown in regions R5 and R6 of FIG. 14, a test position where an internal defect is generated is represented with a gradient (for example, a gradient near 255) higher than a normal place.

In a case where a defect occurs in the surface, for example, as in the A scope image shown in FIG. 11, the maximum amplitude value beyond the second threshold value G2 indicates the substantially same amplitude as in the normal state. For this reason, a change resulting from the gradient is not indicated, and the normal state and a place where the surface defect occurs are displayed with the substantially same gradient. Accordingly, a C scope image with a substantially uniform gradient, for example, a C scope image filled in a color almost near black is created.

In this way, the C scan image based on the second threshold value G2 is displayed on the display unit 16, whereby it is possible to allow the tester to recognize a position where the internal defect occurs.

In a case where a reflected echo signal when the ultrasonic probe 2 is moved along the surface of the test object and positional information are input from the signal acquisition unit 31, the image creation unit 37 creates a C scan image based on the depth according to the reflected echo signal and the first threshold value G1. For example, the image creation unit 37 compares the reflected echo signal with the first threshold value G1 and detects the maximum amplitude value beyond the first threshold value G1. Then, the C scan image based on the depth is created by calculating the depth from the surface based on a time when a waveform indicating the detected maximum amplitude value is acquired and displaying a pixel at each position with a gray value according to the calculated depth.

Since the acquired depth is the same value as the depth W detected by the defect detection unit 36, the depth W obtained by the defect detection unit 36 may be used.

For example, the image creation unit 37 has information for converting the depth into a gray value (gradation value) and acquires the gray value according to the depth using information. Then, the C scan image based on the depth is created by displaying a position, at which each reflected echo signal is acquired, with a gray value corresponding to the depth.

Figure 15:
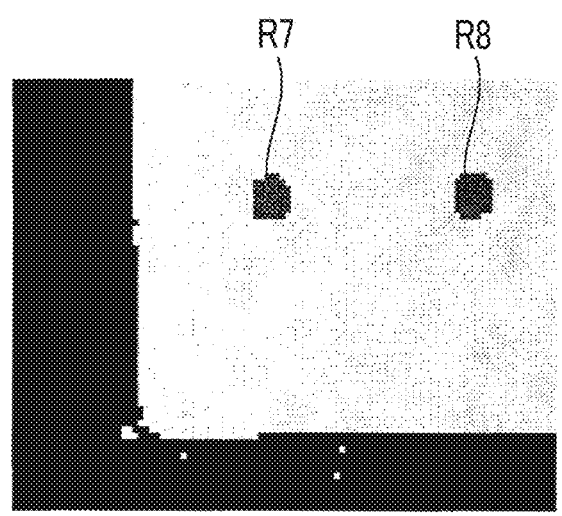
FIG. 15 is a diagram showing an example of a C scan image based on a depth in a case where a defect is present inside the test object.
Figure 16:
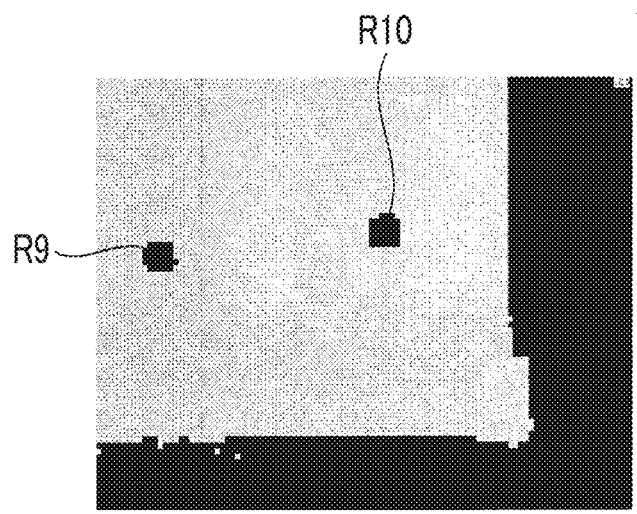
FIG. 16 is a diagram showing an example of a C scan image based on a depth in a case where a defect is present in the surface of the test object.

For example, an example of the C scan image based on the depth is shown in FIGS. 15 and 16. In the C scan image based on the depth shown in FIG. 15, a case where the gradation value is greater as the depth W is deeper, that is, a position is represented with a gradient nearer to black as the depth W is shallower and is represented with a gradient nearer to white as the depth is deeper is exemplified. For example, as in the A scope image shown in FIG. 7, a normal test position where an internal defect does not occur is displayed with a gradient near the reference depth W_ref since a value near the reference depth W_ref is indicated.

On the other hand, in a case where an internal defect occurs, as in the A scope image shown in FIG. 10, the depth W has a value shallower than in the normal state. Accordingly, as shown in regions R7 and R8 of FIG. 15, a test position where an internal defect is generated is represented with a gradient lower than a normal place.

In a case where a defect occurs in the surface, as in the A scope image shown in FIG. 11, a waveform beyond the first threshold value G1 is not present. For this reason, determination is made that detection data is not present, and display is performed in a display aspect (for example, gradient zero) indicating no data. With this, as shown in FIG. 16, a C scope image is created in which test positions R9 and R10 where a surface defect is generated are displayed in black.

In this way, the C scan image based on the depth is displayed on the display unit 16, whereby it is possible to allow the tester to recognize a position where an internal defect or a surface defect is generated.

The image creation unit 37 may perform display indicating a defect at a pixel corresponding to a test position where a defect is detected by the defect detection unit 36 in various C scan images described above. In this way, a detection result of the defect detection unit 36 is reflected in each C scan image, whereby it is possible to notify the tester of the position of the defect more clearly.

The image creation unit 37 may execute, for example, image processing of highlighting a test position, at which a defect is detected by the defect detection unit 36, compared to other places. As an example, a method of coloring in different colors, performing pop-up display, or the like is exemplified.

The image creation unit 37 may further execute mask processing described below on the created C scan image, thereby automatically executing mask processing on a non-test region.

Figure 17:
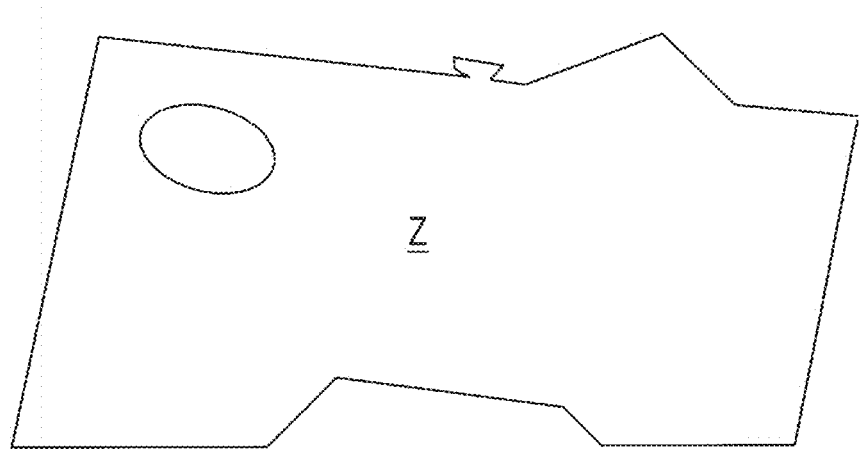
FIG. 17 is a diagram illustrating a procedure of mask processing according to the embodiment of the invention.
Figure 18:
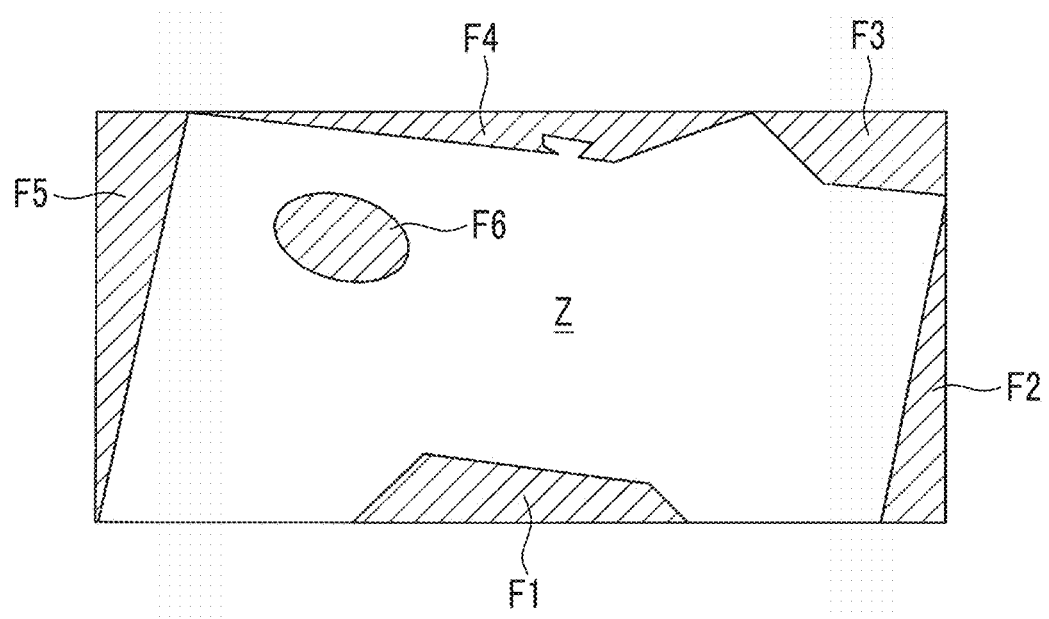
FIG. 18 is a diagram illustrating a procedure of the mask processing according to the embodiment of the invention.

For example, in a case of testing a test region Z of the test object having a surface shape shown in FIG. 17, in a case where a test is performed using the ultrasonic probe 2 having a plurality of sensor elements in a line arranged in a matrix, a non-test region is also irradiated with an ultrasonic wave. However, since a test object is not present in a test region, a reflected echo cannot be received, and data is not present. In this case, a signal indicating the effect that data is not present is output from the ultrasonic probe 2. Then, in a case of creating a C scan image based on a reflected echo signal of a test object including a place where data is not present, a C scan image shown in FIG. 18 is created. In FIG. 18, a hatched region indicates a region where data is not present. In the C scan image including such a non-test region, it is preferable that display is performed in such an aspect that the non-test region can be automatically recognized and the non-test region and the test region can be identified. Hereinafter, a method of automatically executing mask processing on a non-test region will be described referring to the drawings.

Figure 19:
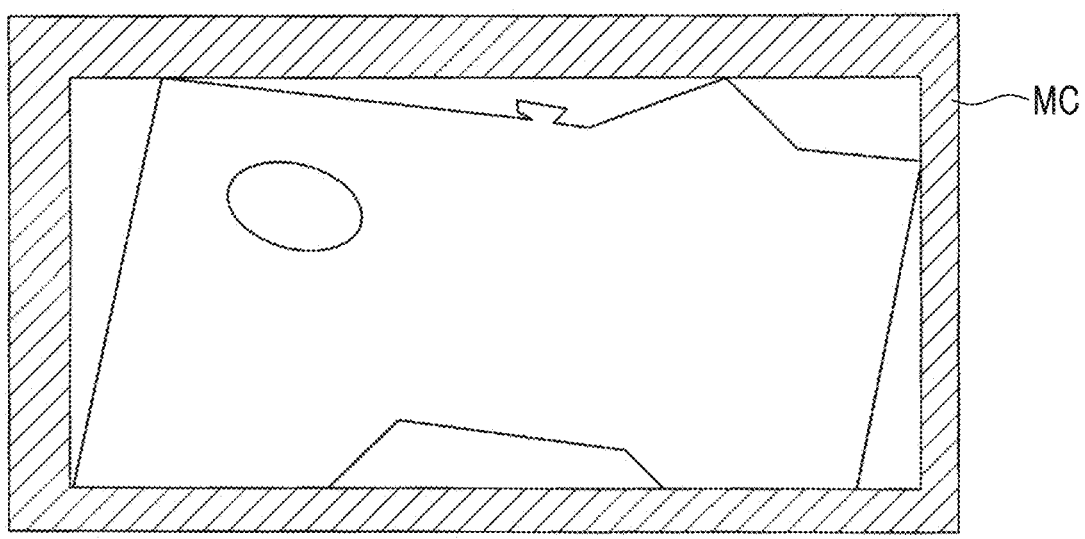
FIG. 19 is a diagram illustrating a procedure of the mask processing according to the embodiment of the invention.
Figure 20:
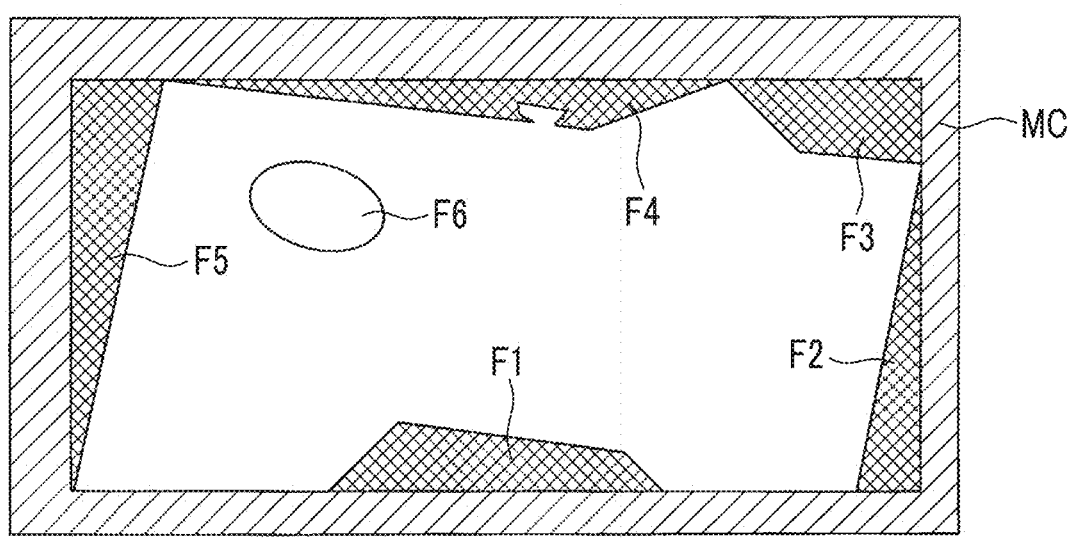
FIG. 20 is a diagram illustrating a procedure of the mask processing according to the embodiment of the invention.

First, as shown in FIG. 19, the image creation unit 37 disposes a masking region MC to surround the outer periphery of the C scan image. Subsequently, as shown in FIG. 20, regions F1 to F5 with no data in contact with the masking region MC are specified, and the specified regions F1 to F5 are displayed as a non-test region in an aspect different from the test region.

Figure 21:
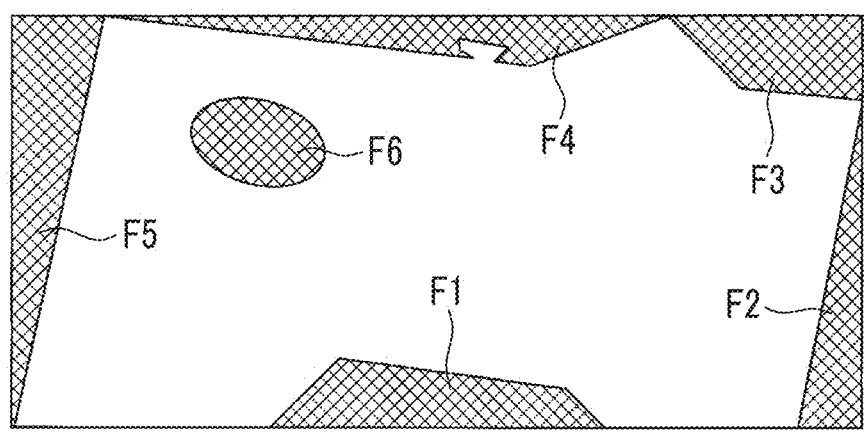
FIG. 21 is a diagram illustrating a procedure of the mask processing according to the embodiment of the invention.

Subsequently, as shown in FIG. 21, as the masking region MC is deleted, the non-test regions F1 to F5 disposed on the outer periphery can be automatically subjected to the mask processing. Subsequently, in a C scan image shown in FIG. 21, the input unit 15 is operated by the tester, and in a case where a non-test region F6 that is present within the test region Z is designated, the image creation unit 37 also displays the non-test region F6 in the same aspect as the non-test regions F1 to F5. With this, it is possible to provide the tester with the C scan image in which the non-test regions F1 to F6 and the test region Z are clearly divided.

In the above-described mask processing, it is possible to automatically detect the non-test regions F1 to F5 disposed on the outer periphery of the test object, and to allow the tester to save labor for designating a non-test region. In a case where only the reflected echo signal of the test object is acquired, and the defect detection processing or the C scan image creation processing is executed later, the defect detection processing is not needed in a region designated as a non-test region. For this reason, it is possible to achieve reduction of burden in processing or time reduction.

The display control unit 38 controls the display unit 16. For example, the display control unit 38 makes the display unit 16 display the C scan image created by the image creation unit 37 or the detection result of the defect detection unit 36.

Figure 22:
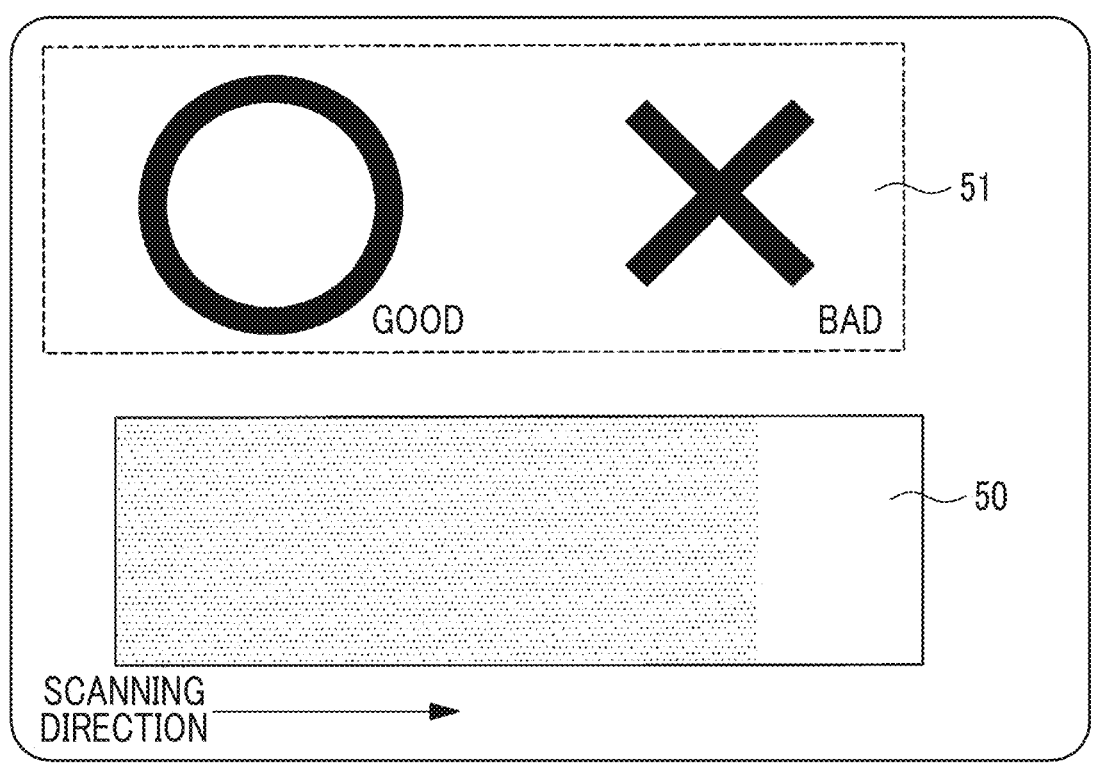
FIG. 22 is a diagram showing an example of a display screen that is displayed on a display unit.

An example of a display screen of the display unit 16 is shown in FIG. 22. As shown in FIG. 22, the display unit 16 has a display region 50 where a C scan image is displayed and a display region 51 where a defect detection result of the defect detection unit 36 is displayed. In the display region 50, one of the C scan image based on the first threshold value G1, the C scan image based on the second threshold value G2, and the C scan image based on the depth can be displayed. The display screen is an example, and a configuration may be made in which the three C scan images may be displayed or the C scan images may be switched and displayed on the display region 50 in time division.

In the display region 51, a cross mark is displayed in a case where a defect is detected, and a round mark is displayed in a case where a defect is not detected. In addition to notification through display, defect detection may be notified by voice, a buzzer, or the like.

Next, an ultrasonic testing method that is realized by the ultrasonic testing system 1 having the above-described configuration will be described referring to the drawings. In the following description, a case where a test is performed using the ultrasonic probe having a plurality of sensor elements in a line is exemplified and described.

Figure 23:
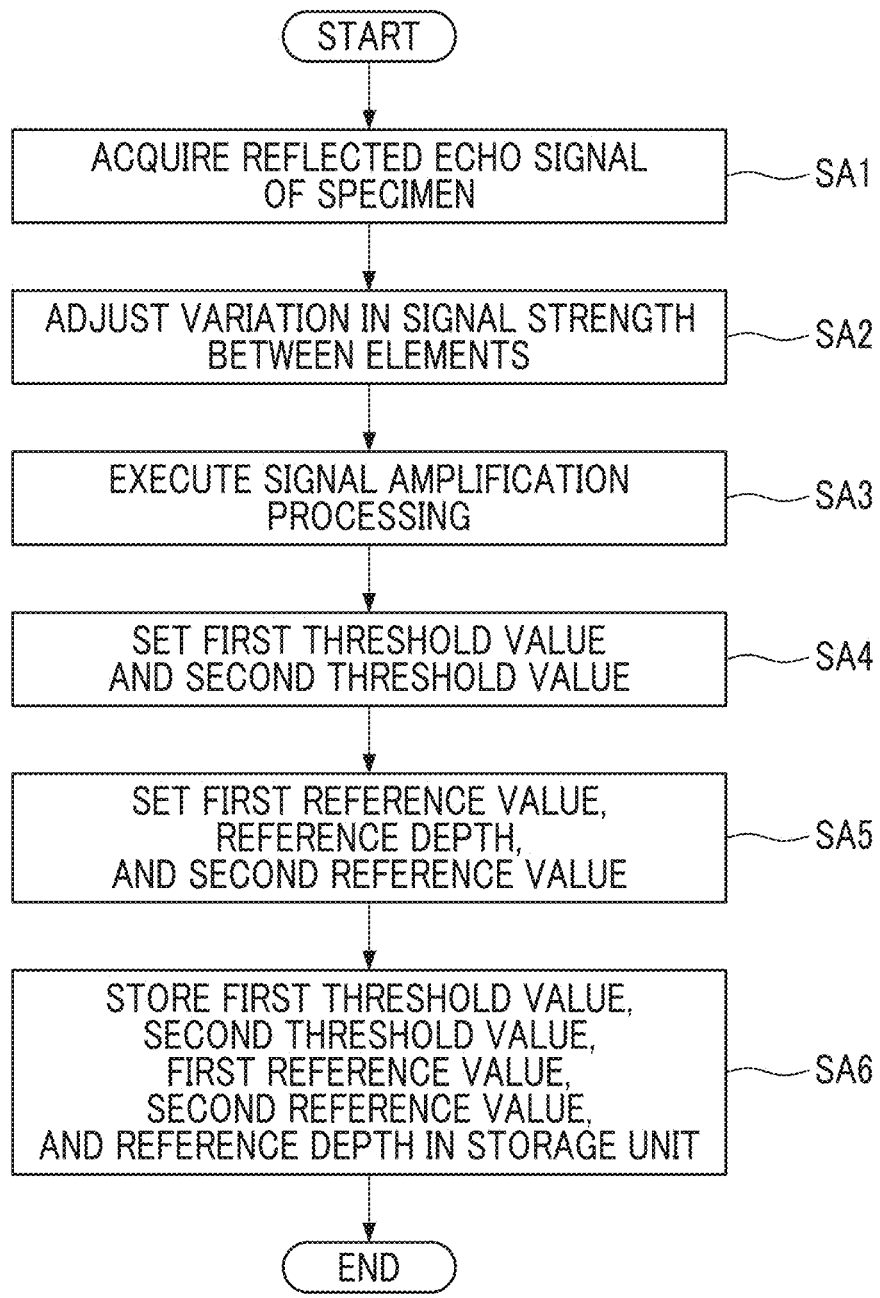
FIG. 23 is a flowchart showing an example of a procedure of preprocessing according to the embodiment of the invention.

First, prior to a test of the test object, preprocessing is executed. In the preprocessing, a test for acquiring a reference signal and the like using a specimen simulating a normal test object is performed. As the specimen, a part of the normal test object may be used. FIG. 23 is a flowchart showing an example of a procedure of the preprocessing in the ultrasonic testing method that is realized by the ultrasonic testing system 1 according to the embodiment of the invention. Hereinafter, the preprocessing will be described referring to FIG. 23.

First, the tester brings the ultrasonic probe into contact with the surface of the specimen and irradiates the inside of the specimen with ultrasonic waves. With this, a reflected echo of the ultrasonic wave is received by each element of the ultrasonic probe and is output as a reflected echo signal to the ultrasonic testing device 3.

In the ultrasonic testing device 3, in a case where the reflected echo signal is acquired at each test position (SA1), variation in signal strength of the reflected echo signal among the elements is adjusted (SA2), and subsequently, the signal amplification processing of the signal amplification unit 33 is executed (SA3).

Subsequently, the first threshold value G1 and the second threshold value G2 for use in detecting an internal defect of the test object are set using each reference signal after the signal amplification processing (SA4), and the first reference value Y1_ref, the reference depth W_ref, and the second reference value Y2_ref are set using the first threshold value G1 and the second threshold value G2, and the reference signal (SA5). The first threshold value G1, the second threshold value G2, the first reference value Y1_ref, the second reference value Y2_ref, and the reference depth W_ref are stored in the storage unit 35 (SA6), and the preprocessing ends.

As described above, the reference signal, the first threshold value G1, the second threshold value G2, the first reference value Y1_ref, the second reference value Y2_ref, and the reference depth W_ref are set for each sensor element constituting the ultrasonic probe 2, and at the time of the test of the test object, defect detection may be performed using the reference values and the like corresponding to each sensor element. Alternatively, the first threshold value G1, the second threshold value G2, the first reference value Y1_ref, the second reference value Y2_ref, and the reference depth W_ref common to all sensor elements constituting the ultrasonic probe 2 may be set, and the test of the test object may be performed using the common threshold values and the like. In a case where the common threshold values and the like are used, an average value, a maximum, a minimum value, or the like among the elements may be appropriately employed.

Figure 24:
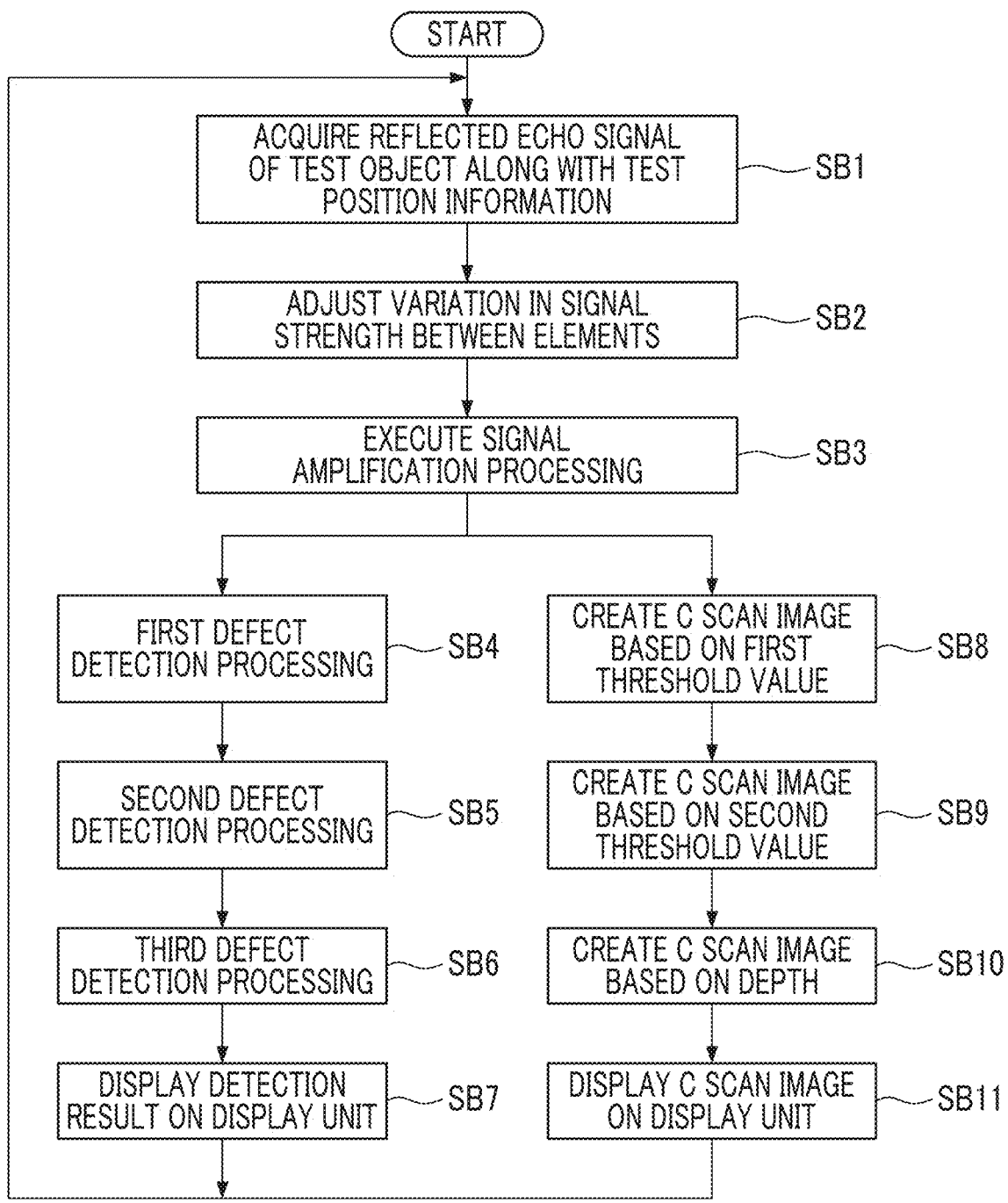
FIG. 24 is a flowchart showing an example of a procedure of ultrasonic test processing according to the embodiment of the invention.

In this way, in a case where the threshold values or the reference values needed for detecting a defect of the test object are prepared, subsequently, the test of the test object is executed. FIG. 24 is a flowchart showing an example of a procedure of ultrasonic test processing that is executed by the ultrasonic testing system 1 according to the embodiment of the invention. Hereinafter, the ultrasonic test processing of the test object will be described referring to FIG. 24.

In the test of the test object, the tester holds the ultrasonic probe 2 and moves the ultrasonic probe along the surface of the test object. With this, the inside of the test object is irradiated with an ultrasonic wave at each test position of the test object, and a reflected echo of the ultrasonic wave is sequentially received. The reflected echo of the test object obtained in this manner is converted into a reflected echo signal through predetermined processing and is sequentially output to the ultrasonic testing device 3 in association with corresponding positional information (SB1).

In a case where the reflected echo signal at each surface position output from the ultrasonic probe is input, variation in signal strength of the reflected echo signal among the elements is adjusted (SB2), and the signal amplification processing is executed (SB3).

Subsequently, defect detection is performed using the reflected echo signal at each surface position, and the first threshold value G1, the second threshold value G2, the first reference value Y1_ref, the second reference value Y2_ref, and the reference depth W_ref stored in the storage unit 35.

Specifically, the first defect detection processing (SB4) using the first measured value Y1 obtained from the reflected echo signal and the first reference value Y1_ref, the second defect detection processing (SB5) using the depth W obtained from the reflected echo signal and the reference depth W_ref, and the third defect detection processing (SB6) using the second measured value Y2 obtained from the reflected echo signal and the second reference value Y2_ref are executed, and a defect detection result is displayed in the display region 51 of the display unit 16 (SB7). For example, a cross mark is displayed in the display region 51 in a case where a defect is detected in any one kind of defect detection processing, and a round mark is displayed in the display region in a case where a defect is not detected.

Instead of performing determination of a defect with point as described above, a cross mark may be displayed in the display region 51 in a case where a certain degree of width of a defect is detected. That is, while there is no need to particularly display a cross mark and to give notification to the tester on a negligible micro defect, in a case where a defect having a certain degree of size (length, width, area, or the like) is detected, notification may be given to the tester. In view of this point, for example, instead of displaying a cross mark in the display region 51 instantly in a case where a defect is detected as described above, for example, a position where a defect is detected may be recorded on the same map as the C scan image, and in a case where a size of a defect part exceeds an allowable value set in advance on the map, a cross mark may be displayed in the display region 51. In a case of displaying a cross mark in the display region 51, the size (length, width, area, or the like) of the defect may be displayed.

The gradation value based on the first threshold value is decided based on the reflected echo signal and the positional information, and the pixel corresponding to the test position where the reflected echo signal is acquired is displayed with the decided gradation value, whereby the C scan image based on the first threshold value is gradually created (SB8). Similarly, the gradation value based on the second threshold value is decided, and the pixel corresponding to the test position where the reflected echo is acquired is displayed with the decided gradation value, whereby the C scan image based on the second threshold value is gradually created (SB9). Similarly, the gradation value based on the depth is decided, and the pixel corresponding to the test position where the reflected echo signal is acquired is displayed with the decided gradation value, whereby the C scan image based on the depth is gradually created (SB10). Then, the created C scan image is displayed in the display region 50 of the display unit 16 (SB11).

The above-described processing is executed, whereby the presence or absence of a defect at a test place is displayed in the display region 51 of the display unit 16 in real time, and a C scan image corresponding to a place where a test is finished is displayed in the display region 50. Then, various kinds of processing described above are sequentially executed each time the reflected echo signal is received, whereby defect detection in real time is realized.

In the embodiment, although a case where defect detection is performed in real time has been exemplified, acquisition of a reflected echo signal through a test and the defect detection processing and the like based on the reflected echo signal do not always need to be executed simultaneously. For example, a reflected echo signal obtained by the tester who moves the ultrasonic probe 2 along the surface of the test object may be stored in the storage unit 35 in association with a test position, the reflected echo signal at each test position stored in the storage unit 35 may be read later, the above-described defect detection processing and the like may be executed using the read reflected echo signal, and a test result may be notified to the tester later.

As described above, with the ultrasonic testing device 3, the method, the program, and the ultrasonic testing system 1 according to the embodiment, the reflected echo signal in the test object is acquired by the signal acquisition unit 31, and defect detection of the defect detection unit 36 is performed based on the reflected echo signal. Specifically, the defect detection unit 36 detects a defect of the test object using the maximum signal strength of the reflected echo signal beyond the first threshold value. In this case, the first threshold value has the evaluation range between the first position at the first distance from the surface of the test object and the bottom surface of the test object, and the signal strength of the first threshold value is set to a value smaller than the maximum signal strength of the reflected echo signal from the surface. For this reason, it is possible to take a reflected echo reflected from a defect inside the test object, and to detect an internal defect.

With the ultrasonic testing device 3 according to the embodiment, the second defect detection processing of detecting an internal defect based on the depth and the third defect detection processing of detecting an internal defect based on the second threshold value are executed, and determination is made that a defect is present in a case where a defect is detected in any one kind of defect detection processing. For this reason, it is possible to improve the accuracy of defect detection.

With the ultrasonic testing device 3 according to the embodiment, since defect detection is automatically performed, it is possible to easily perform a test of the test object even though there is no qualified tester. Since human determination does not intervene in determination regarding whether or not a defect is present, it is possible to perform defect detection quantitatively.

With the ultrasonic testing device, the image creation unit 37 adds the masking region MC to surround the outer periphery of the C scan image and specifies a region, in which the reflected echo signal is not detected, and which is in contact with the masking region MC, as a non-test region. With this, it is possible to automatically detect a non-test region. In addition, since the specified non-test region is displayed in an aspect different from the test region, it is possible to notify the tester of the non-test region and the test region clearly.

Although the invention has been described above in connection with the embodiment, the technical scope of the invention is not limited to the scope described in the above-described embodiment. Various alterations or improvements can be made to the above-described embodiment without departing from the spirit and scope of the invention, and any forms resulting from such alterations or improvements still fall within the technical scope of the invention. The above-described embodiment may be appropriately combined.

The procedure of the preprocessing and the procedure of the ultrasonic testing method described in the above-described embodiment are examples, and unneeded steps may be deleted, new steps may be added, and a processing order may be changed without departing from the spirit and scope of the invention.

For example, in the above-described embodiment, although the defect detection processing is executed using both of the first threshold value and the second threshold value, for example, defect detection may be performed using only the first threshold value or defect detection may be performed using only the second threshold value. That is, all of the first defect detection processing, the second defect detection processing, and the third defect detection processing described above may not always be executed, and defect detection may be performed using one of the first defect detection processing, the second defect detection processing, and the third defect detection processing. In a case of the third defect detection processing, it is hard to detect a defect generated in the surface; however, even in this case, it is possible to a defect that is generated inside the test object like the first defect detection processing and the second defect detection processing.

In the above-described embodiment, the S gate (third threshold value) may be used in the defect detection processing. For example, in the preprocessing using the specimen, a maximum amplitude value is detected from a waveform beyond the S gate (third threshold value) in the A scope image of the reference signal, and the maximum amplitude value is defined as a surface reflected echo reference value. Then, at the time of a test, the maximum amplitude value may be acquired from the waveform beyond the S gate in the reflected echo signal, and in a case where a difference between the maximum amplitude value and the surface reflected echo reference value exceeds an allowable range set in advance, a defect may be detected. In this way, for example, it is possible to easily detect a defect that is present in the surface shown in FIG. 11. Defect detection processing combined with the first threshold value or the second threshold value is executed, whereby it is possible to improve the accuracy of defect detection.

In the above-described embodiment, although the image creation unit 37 creates the C scan image based on the first threshold value, the C scan image based on the second threshold value, and the C scan image based on the depth, the image creation unit 37 may have a function of creating at least one C scan image of the C scan images.

The display with changing the gradient is an example, and for example, it is sufficient that a display aspect according to the maximum amplitude value or the depth is made. For example, saturation of a pixel may be changed or a kind of hatching may be change.

The invention claimed is:

1. An ultrasonic testing device comprising:
    a signal acquisition unit that receives a test object reflected echo signal relating to a reflected echo from an ultrasonic probe, which irradiates an inside of a test object with an ultrasonic wave and receives the test object reflected echo from the test object;
    a defect detection unit that detects a defect of the test object based on the test object reflected echo signal; and
    a display unit that displays a detection result of the defect detection unit,
    wherein the defect detection unit detects, as a first measured value, a maximum amplitude value of the test object reflected echo signal beyond a first threshold value by comparing a signal strength of the test object reflected echo signal with the first threshold value in an evaluation range between a first position at a first distance from a surface of the test object and a bottom surface of the test object, and detects the defect of the test object by comparing the first measured value with a first reference value,
    the first threshold value is a value smaller than a maximum amplitude value of a surface reflected echo signal of a normal test object, and
    the first reference value is a value larger than the first threshold value, and in an evaluation range for the normal test object, the first reference value is a maximum amplitude value of a reference reflected echo signal of the normal test object beyond the first threshold value, by comparison of a signal strength of the reference reflected echo signal of the normal test object with the first threshold value, wherein the reference reflected echo signal is obtained within the evaluation range for the normal test object.

2. The ultrasonic testing device according to claim 1, further comprising:
a signal amplification unit that amplifies the test object reflected echo signal using a distance-amplitude correction curve in which a signal amplification degree according to a distance from the surface in a depth direction is set,
wherein the defect detection unit detects the defect of the test object using the test object reflected echo signal after signal amplification.

3. The ultrasonic testing device according to claim 1,
wherein the defect detection unit detects the defect of the test object using maximum signal strength of the test object reflected echo signal beyond a second threshold value,
the second threshold value has an evaluation range between a second position at a second distance from the surface of the test object and a third position at a third distance from the bottom surface of the test object,
the second position is set to a position farther from the surface than the first position, and
signal strength of the second threshold value is set to a value smaller than the signal strength of the first threshold value.

4. The ultrasonic testing device according to claim 3, further comprising:
an image creation unit that creates a C scan image from the test object reflected echo signal when the ultrasonic probe is moved along the surface of the test object and positional information where the test object reflected echo signal is obtained,
wherein the C scan image includes at least one of a first threshold value-based C scan image created based on a maximum amplitude value beyond the first threshold value in the test object reflected echo signal, a depth-based C scan image created based on a depth obtained from the test object reflected echo signal, or a second threshold value-based C scan image created based on a maximum amplitude value beyond the second threshold value in the test object reflected echo signal.

5. The ultrasonic testing device according to claim 4,
wherein the image creation unit
adds a masking region to surround an outer periphery of the C scan image,
specifies a region, in which the test object reflected echo signal is not detected and which is in contact with the masking region, as a non-test region, and
displays the specified non-test region in an aspect different from a test region.

6. The ultrasonic testing device according to claim 1,
wherein the defect detection unit detects the defect of the test object using maximum signal strength of the test object reflected echo signal beyond a third threshold value, and
the third threshold value has a predetermined distance defined between the surface of the test object and the first position as an evaluation range, and signal strength of the third threshold value is set to a value smaller than the maximum signal strength of the reference reflected echo signal from a second evaluation range between the surface and a first position of the normal test object.

7. An ultrasonic testing system comprising:
an ultrasonic probe; and
the ultrasonic testing device according to claim 1.

8. A non-transitory computer readable storage medium storing an ultrasonic testing program causing a computer to function as an ultrasonic testing device according to claim 1.

9. An ultrasonic testing method comprising:
a signal acquisition step of receiving a test object reflected echo signal relating to a reflected echo from an ultrasonic probe, which irradiates an inside of a test object with an ultrasonic wave and receives the test object reflected echo from the test object;
a defect detection step of detecting a defect of the test object based on the test object reflected echo signal; and
a display step of displaying a detection result of the defect detection step,
wherein the defect detection step detects, as a first measured value, a maximum amplitude value of the test object reflected echo signal beyond a first threshold value by comparing a signal strength of the test object reflected echo signal with the first threshold value in an evaluation range between a first position at a first distance from a surface of the test object and a bottom surface of the test object, and detects the defect of the test object by comparing the first measured value with a first reference value,
the first threshold value is a value smaller than a maximum amplitude value of a surface reflected echo signal of a normal test object, and
the first reference value is a value larger than the first threshold value, and in the evaluation range for the normal test object, the first reference value is a maximum amplitude value of a reference reflected echo signal of the normal test object beyond the first threshold value, by comparison of a signal strength of the reference reflected echo signal of the normal test object with the first threshold value, wherein the reference reflected echo signal is obtained within the evaluation range for the normal test object.

* * * * *